United States Patent
Tanaka et al.

(10) Patent No.: US 9,657,600 B2
(45) Date of Patent: May 23, 2017

(54) HEAT EXCHANGER, A PURIFIER, AN ELECTRODE-CONTAINING PIPE, A POWER GENERATION SYSTEM, A CONTROL METHOD FOR HEAT EXCHANGER AND A SCALE REMOVING METHOD

(71) Applicant: Innovative Designs & Technology Inc., Shizuoka (JP)

(72) Inventors: Hiroshi Tanaka, Shizuoka (JP); Fumika Sakai, Shizuoka (JP)

(73) Assignee: Innovative Designs & Technology Inc., Shizuoka (JP)

( * ) Notice: Subject to any disclaimer, the term of this patent is extended or adjusted under 35 U.S.C. 154(b) by 0 days.

(21) Appl. No.: 14/953,416

(22) Filed: Nov. 29, 2015

(65) Prior Publication Data

US 2016/0222831 A1 Aug. 4, 2016

(30) Foreign Application Priority Data

Feb. 2, 2015 (JP) ................. 2015-018293
Apr. 15, 2015 (JP) ................. 2015-083694
Jun. 16, 2015 (JP) ................. 2015-121147

(51) Int. Cl.
*C02F 1/461* (2006.01)
*B08B 9/027* (2006.01)
(Continued)

(52) U.S. Cl.
CPC ............. *F01K 7/38* (2013.01); *B08B 9/027* (2013.01); *C02F 1/4602* (2013.01);
(Continued)

(58) Field of Classification Search
CPC ........... C02F 1/46104; C02F 1/4602; C02F 2201/4613; C02F 2201/46119; F01K 13/006; B08B 9/027
See application file for complete search history.

(56) References Cited

U.S. PATENT DOCUMENTS

2004/0112812 A1* 6/2004 Kawabe .............. C02F 1/4602
                                                          210/175
2009/0038944 A1* 2/2009 Kruger .................. C02F 1/4602
                                                          204/555
(Continued)

FOREIGN PATENT DOCUMENTS

JP      S 60-38096        2/1985
JP      S 60-138212 A     7/1985
(Continued)

*Primary Examiner* — Nicholas A Smith
(74) *Attorney, Agent, or Firm* — Intellectual Property Law Group LLP

(57) ABSTRACT

A heat exchanger includes an electrolytic bath and a control section. The electrolytic bath has first and second channels. A first fluid can flow through the first channel. A second fluid adapted to exchange heat with the first fluid can flow through the second channel. At least part of the first and second channels of the electrolytic bath is partitioned by anode and cathode plates to which a given potential is applied from a power source. The control section applies the given potential to the anode and cathode plates and performs polarity reversal adapted to reverse the polarity of the anode and cathode plates after having applied the given potential at given time intervals.

10 Claims, 15 Drawing Sheets

(51) Int. Cl.
*F01K 13/00* (2006.01)
*F01K 7/38* (2006.01)
*C02F 1/46* (2006.01)
*F28F 19/00* (2006.01)
*F22B 1/16* (2006.01)
*C02F 103/02* (2006.01)

(52) U.S. Cl.
CPC ...... *C02F 1/46104* (2013.01); *C02F 1/46109* (2013.01); *F01K 13/006* (2013.01); *F22B 1/16* (2013.01); *F28F 19/004* (2013.01); *C02F 2001/46119* (2013.01); *C02F 2001/46152* (2013.01); *C02F 2103/023* (2013.01); *C02F 2201/4613* (2013.01)

(56) References Cited

U.S. PATENT DOCUMENTS

| | | | | |
|---|---|---|---|---|
| 2009/0071843 | A1* | 3/2009 | Miyashita | C02F 1/4618 205/746 |
| 2014/0116889 | A1* | 5/2014 | Nakamoto | C02F 1/4618 205/556 |
| 2016/0057810 | A1* | 2/2016 | De Vries | C02F 1/4602 392/457 |

FOREIGN PATENT DOCUMENTS

| | | |
|---|---|---|
| JP | 1991007435 | 1/1991 |
| JP | 1991127686 | 5/1991 |
| JP | 1991157190 | 7/1991 |
| JP | 1994000481 | 1/1994 |
| JP | 1997010770 | 1/1997 |
| JP | 1997141285 | 6/1997 |
| JP | H 10-87381 A | 4/1998 |
| JP | H 10-128334 A | 5/1998 |
| JP | 1998300388 | 11/1998 |
| JP | 11-350920 | 12/1999 |
| JP | 2001246378 | 9/2001 |
| JP | 2001246382 | 9/2001 |
| JP | 2002018442 | 1/2002 |
| JP | 2004190924 | 7/2004 |
| JP | 2004234999 | 8/2004 |
| JP | 2005177672 | 7/2005 |
| JP | 4444001 | 12/2005 |
| JP | 2005337643 A * | 12/2005 |
| JP | 2006-95426 | 4/2006 |
| JP | 3122342 U | 6/2006 |
| JP | 2007268346 | 10/2007 |
| JP | 2009061366 | 3/2009 |
| JP | 4334205 | 9/2009 |
| JP | 2009-219951 | 10/2009 |
| JP | 2009243797 | 10/2009 |
| JP | 2010069366 | 4/2010 |
| JP | 2012130872 | 7/2012 |
| JP | 4999030 | 8/2012 |
| JP | 2013-201873 | 10/2013 |
| JP | 2014129978 A | 7/2014 |
| JP | 2014173800 | 9/2014 |
| JP | 2014202150 A | 10/2014 |
| WO | WO 2006/027825 | 3/2006 |
| WO | WO2012144277 A1 | 10/2012 |

* cited by examiner (a)

(b)

(a)

(b)

(a)

(b)

(c)

HEAT EXCHANGER, A PURIFIER, AN ELECTRODE-CONTAINING PIPE, A POWER GENERATION SYSTEM, A CONTROL METHOD FOR HEAT EXCHANGER AND A SCALE REMOVING METHOD

BACKGROUND OF INVENTION

Technical Field

The present invention relates to a heat exchanger, a purifier, an electrode-containing pipe, a power generation system, a control method for heat exchanger and a scale removing method.

Related Art

In response to growing global environmental protection, an attention to the power generation using geothermal or industry waste heat resulting from the process of producing an industrial products has increased since there is very little carbon dioxide emissions.

In geothermal power generation method, the following two methods exist. That is, the first method is a flash-cycle system which carries out the power generation by leading the geothermal steam that occurs when a thermal fluid of the gas-liquid state heated at the deep underground is jetted through a well to the ground to the turbine.

In addition, the second method is a binary-cycle system which carries out the power generation by leading a vapor of the working fluid heated by a thermal fluid at a heat exchanger to the turbine.

In the power generation using the binary-cycle system, in recent years, it has been developed for binary power generation system using geothermal water such as spring water as an example of a thermal fluid.

Geothermal water is often present in relatively shallow depth of the underground, and there is an advantage of low installation costs and risks as compared to conventional geothermal power generation. It should be noted that a low boiling point medium having a 100° C. temperature below of the boiling point such as substitute for CFCs (HFE), pentane ($C_5H_{12}$), ammonia is used as the working fluid.

In this binary power generating system, a steam of the low boiling point medium is generated by a heat exchange between the geothermal water introduced into the heat exchanger on the ground and the low boiling point medium also introduced into the heat exchanger. And then, power generation is carried out by rotating a turbine with the steam of the low boiling point medium introduced into the steam turbine.

It is repeated that the steam of the low boiling point medium exhausted from the steam turbine is sent to the heat exchanger again after it is cooled in the condensation machine so that the low boiling point medium is heated by the geothermal water to become the steam of the low boiling point medium.

The technology paying attention to improving the utilization efficiency of the energy of the heat fluid, such as following patent document 1 or patent document 2, is proposed.

For instance, according to the patent document 1, it is indicated to improve the efficiency of the power generating system by changing the evaporation temperature of the thermal fluid, changing the combinations of the vaporizer and the pre-heater, or using the compound liquid of ammonia and water for the operation fluid.

Moreover, according to the patent document 2, it is indicated to supply the hot spring water to the power generating device continuously by using the gushing out power of the hot spring water, the gush power of the hot spring gas, and the vertical interval (difference of potential energy).

The calcium salt of the accident dissolubility that is called a scale might adhere to the inner wall of pipe which is used for the geothermal power generation system because the thermal fluid circulates in the pipe. When this scale adheres in pipe and a long term passes, blocking pipe and the decrease in the heat exchange efficiency are caused.

Therefore, the scale has been removed by adding medicine such as the scale inhibitors or by using a brush to remove mechanically.

However, the prevention of environmental pollution becomes worldwide standard in recent years, and the use of such medicine is withheld voluntarily. Moreover, some damage to the pipe might occur when the scale is mechanically removed by using the brush.

Then, the method of preventing the scale adhesion using the electrolysis processing is developed as a new technique that substitutes for the medicine washing and the brush washing. For instance, according to the patent document 4, the technology that removes the scale by using an anode and a cathode arranged in the electrolysis processor set in circulating passes.

Moreover, according to the patent document 5, the cooling water circulation device having an electrolytic bath storing a cooling water and installed in a cooling water circulation route, a pair of electrode set up in the electrolytic bath, a voltage generator that impresses the voltage between the pair of electrode plates, and an electrolytic device that does an electrolysis processing of the cooling water stored in the electrolytic bath is disclosed.

Patent document 1: Japanese Unexamined Patent Application Publication No. 11-350920
Patent document 2: Japanese Unexamined Patent Application Publication No. 2013-201873
Patent document 3: Japanese Unexamined Patent Application Publication No. 2009-219951
Patent document 4: Japanese Unexamined Patent Application Publication No. 2006-95426
Patent document 5: Re-publication of PCT International Publication WO2006/027825

SUMMARY OF THE INVENTION

Problems to be Solved

However, when the geothermal water is used, it is assumed that the following problems occur. That is, the mineral such as calcium and the element of sulfur content are contained in the hot spring water, and these contains are extracted in the inner wall of the pipe or in the heat exchanger. The heat exchange efficiency of the thermal fluid (geothermal water etc.) and the operation fluid (pentane etc.) is remarkably decreased when this extraction occurs, and it is likely to lead to blocking pipe and the breakdown of the heat exchanger in the worst case.

It is necessary to avoid the rise of the cost and ruining the advantage of the binary power generation, though blocking pipe and the breakdown of the heat exchanger will be decreased if the heat exchanger and pipe are regularly cleaned by human wave tactics. Moreover, the use of such a medicine is controlled voluntarily because of the viewpoint of environmental pollution prevention in recent years though it is thought to introduce the medicine into the heat exchanger and pipe and to wash it.

This kind of problem is not to stay in the thermal fluid including impurities, and it is thought to cause equally to an inflow fluid that flows in the heat exchanger. So, it will become important in the future not to decrease the energy transmission efficiency between the fluids with attention to control the cost.

This invention aims to offer the system and the method of the heat exchanger, the purifier, and pipe with built-in the electrode that can contribute for a low-cost and highly effective power generation, even if the inflow fluid containing impurities is used in the system.

Means of Solving the Problems

To solve the aforementioned problem, at least one of the heat exchanger, a purifier, an electrode-containing pipe is provided.

Specifically, a first aspect of present disclosure provides a heat exchanger comprising an electrolytic bath which has a first channel through which a first fluid flows and a second channel through which a second fluid adapted to exchange heat with the first fluid flows, at least a part of the first and second channels of the electrolytic bath being partitioned by anode and cathode plates to which a given potential is applied from a power source, and a control section which applies the given potential to the anode and cathode plates and performs polarity reversal adapted to reverse the polarity of the anode and cathode plates after having applied the given potential at given time intervals.

The plurality of anode and cathode plates are preferably arranged alternately and opposed to each other within the electrolytic bath in the heat exchanger.

Moreover, a second aspect of present disclosure provides a purifier comprising a vessel connected to a channel through which a thermal fluid flows, an anode and a cathode being arranged to be opposed within the vessel such that a space is formed between the anode and the cathode, and a controller configured to apply a voltage between the anode and the cathode with a liquid provided in the space and configured to store electrolyzed water produced by applying the voltage and configured to supply at least a part of the stored electrolyzed water to the channel.

The vessel preferably includes first and second vessels. The anode and the cathode are arranged inside the first vessel. The second vessel is connected to the first vessel to store the electrolyzed water. The controller supplies the electrolyzed water, stored in the second vessel, to the channel every given period of time.

Further, a third aspect of present disclosure provides an electrode-containing pipe comprising a first electrode which is tubular with a hollow space formed therein, a fluid flowing through the hollow space, and a second electrode which is inserted in the hollow space of the first electrode in such a manner as to be spaced at a given distance from the first electrode.

The electrode-containing pipe preferably further includes insulating spacers adapted to maintain the second electrode spaced at the given distance from the first electrode.

Effect of the Invention

The ingredients such as minerals (calcium ions, magnesium ions etc.) which are contained in the first liquid as the inflow fluid that flows in the power generating system and which causes a decrease in efficiency can be removed according to the invention.

DETAILED DESCRIPTION OF THE PREFERRED EMBODIMENTS

A description will be given below of preferred embodiments of the present disclosure by taking, as an example, a binary power generation system. It should be noted that although, for reasons of explanation, the X, Y, and Z directions are defined as appropriate in the description given below, it is a matter of course that these directions are not intended to reduce the scope of the claims of the present disclosure.

First Embodiment

Figure 1:
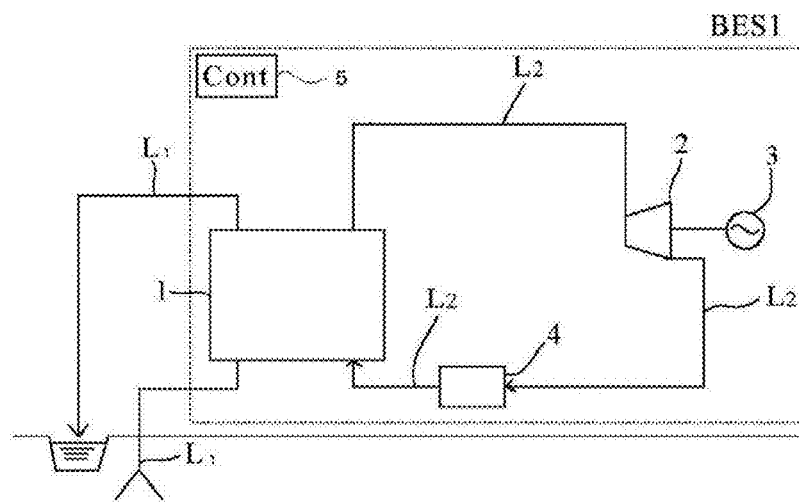
FIG. 1 is a whole block diagram of binary power generating system BES1 that lies in the first embodiment.

FIG. 1 is an overall configuration diagram of a binary power generation system according to a first embodiment of the present disclosure.

A binary power generation system BES1 according to the present embodiment includes a first pipe $L_1$, a heat exchanger (evaporator) 1, a second pipe $L_2$, a steam turbine 2, a generator 3, a condenser 4, and a controller 5. It should be noted that known geothermal power generation systems such as that described in Japanese Patent Laid-Open No. 2013-170553 may be referred to for configurations other than those which will be described in detail below.

The first pipe $L_1$ is designed to connect a thermal fluid source existing in the underground and the heat exchanger 1, and, moreover, the heat exchanger 1 and a river, for example. A thermal fluid is pumped and supplied into the heat exchanger 1 from the thermal fluid source via the first pipe $L_1$ and a pump which is not shown, and at the same time, the thermal fluid whose heat has been exchanged by the heat exchanger 1 is returned (discharged), for example, to a river. It should be noted that the thermal fluid whose heat has been exchanged by the heat exchanger 1 may be not discharged and be reused as a thermal fluid.

As described in the embodiments which will be described later, a "first fluid" to which the present disclosure is applicable is not limited to a thermal fluid. However, a description will be given below first by taking a thermal fluid as an example. Although various thermal fluids can be used, hot spring water at a temperature of about 50° C. to 150° C. is used as a thermal fluid in the present embodiment. It should be noted that industrial wastewater (hot wastewater arising from industrial process such as hot water cleaning) and high-pressure underground water used in geothermal power generation in related art (these will be collectively referred to as "thermal water" as appropriate) are among thermal fluids which can be used in the present embodiment in addition to hot spring water.

The heat exchanger 1 includes an electrolytic bath 11, electrode plates 12, and a control section 13, permitting heat exchange between a thermal fluid pumped from a thermal fluid source via the first pipe $L_1$ and a working fluid which will be described later.

Figure 2:
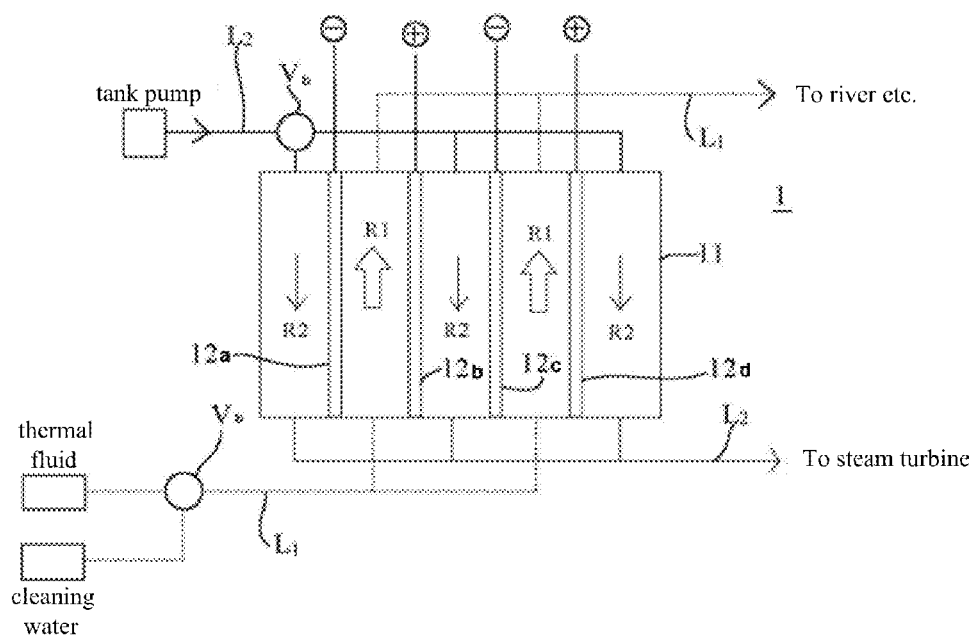
FIG. 2 is a block diagram of the heat exchanger that lies in the first embodiment.

FIG. 2 illustrates a configuration diagram of the heat exchanger 1. The electrolytic bath 11 is an electrolytic bath body designed to permit heat exchange between the working and thermal fluids while at the same time electrolyzing the thermal fluid, with a plurality of (four) electrode plates 12 arranged at a given spacing therebetween and opposed to each other. Then, a given potential is applied to the electrode plates 12 arranged inside the electrolytic bath 11 by a power source which is not shown via wires (e1 and e2). A known device can be used as a power source. A direct current (DC) voltage not larger than 50V, for example, can be applied between the electrode plates 12 as a given voltage.

It should be noted that insulators may be arranged between the electrode plates 12 as necessary to keep the electrode plates 12 spaced at a given distance from each other.

Further, the present embodiment is not limited to an example of arranging a total of four electrode plates, two cathode plates and two anode plates alternately. Alternatively, three cathode plates and three anode plates may be arranged alternately. Still alternatively, one cathode plate and one anode plate may be arranged. Still alternatively, it may be not necessary to arrange equal numbers of cathode plates and anode plates. For example, more cathode plates than anode plates may be provided, and these plates may be arranged alternately.

Then, channels are formed by the wall surface of the electrolytic bath 11 and the electrode plates 12 inside the electrolytic bath 11, each for the thermal or working fluid to flow. In FIG. 2, a second channel R2 is formed for the working fluid to flow. One segment of the second channel R2 is formed by the wall surface of the electrolytic bath 11 and a cathode plate $12_a$, another segment thereof by an anode plate $12_b$ and a cathode plate $12_c$, and still another segment thereof by an anode plate $12_d$ and the wall surface of the electrolytic bath 11. Further, a first channel R1 is formed for the thermal fluid to flow. One segment of the first channel R1 is formed by the cathode plate $12_a$ and the anode plate $12_b$, and another segment thereof by the cathode plate $12_c$ and the anode plate $12_d$. As described above, at least part of the channel for the thermal or working fluid to flow is partitioned within the electrolytic bath 11 by the electrode plates 12 (anode and cathode plates) to which a given potential is applied from the power source.

This ensures that the thermal and working fluids flow inside the heat exchanger 1 in a manner isolated from each other.

It should be noted that although the fluids flowing through the first and second channels R1 and R2 do so in opposite directions, the fluids flowing therethrough may do so in the same direction in FIG. 2. Further, a known sealing material may be provided at the boundary between the wall surface of the electrolytic bath 11 and each of the electrode plates 12 to prevent the fluids from flowing out into the neighboring channels. In this case, an insulating resin is preferred for use as a sealing material.

The control section 13 applies a given potential to the electrode plates 12 form a commercial power source which is not shown during heat exchange and, at the same time, cleans the surfaces of the cathode plates (cathode plates $12_a$ and $12_c$ in FIG. 2) (described later).

The second pipe $L_2$ is designed for the working fluid, an example of a "second fluid," to flow. In the present embodiment, the second pipe $L_2$ is used to circulate the working fluid in the heat exchanger 1, the steam turbine 2, and the condenser 4. That is, the working fluid circulates within a closed loop between these devices. It should be noted that there are no limitations on working fluid except that a fluid having a lower boiling point than thermal fluid is used, and that various fluids such as butane ($C_4H_{10}$) and chlorofluorocarbon (CFC) substitutes (HFE) can be used. In the present embodiment, pentane ($C_5H_{12}$) having a boiling point at about 36° C. is used as a working fluid.

Pentane as a working fluid receives heat from hot spring water within the heat exchanger 1, evaporating or vaporizing into a working gas and being introduced into the steam turbine 2 via the second pipe $L_2$.

The steam turbine 2 is connected to the heat exchanger 1 via the second pipe $L_2$ and does work using pentane in steam form introduced from the heat exchanger 1 via the second pipe $L_2$.

The generator 3 is connected to the steam turbine, generating power in accordance with work done by the steam turbine 2. Power generated by the generator 3 is supplied to substations of electric utilities, homes, and so on via transformers which are not shown.

The condenser 4 is connected to the steam turbine 2 and the heat exchanger 1 via the second pipe $L_2$. Then, in the condenser 4, pentane in steam form that has gone through the steam turbine 2 is condensed (heat thereof is exchanged) using, for example, water or air, transforming it into pentane in liquid form. Then, pentane that has been transformed into liquid form is introduced back into the heat exchanger 1 via the second pipe $L_2$ and a pump which is not shown as a working fluid.

<Precipitation in the Heat Exchanger 1>

In a binary power generation system BES according to the present embodiment, thermal water flows through the first pipe $L_1$ and part of the heat exchanger 1 as a thermal fluid.

For example, if thermal water is hot spring water, it is common that minerals such as magnesium, potassium, sodium, and calcium and other ingredients such as sulfur contents are included.

For example, in the case of a calcium-rich hydrogen carbonate spring, some of the ingredients dissolved in hot spring water change into solids (e.g., $C_aCO_3$) which precipitate in the first pipe $L_1$ and the heat exchanger 1 as a result of the chemical reaction shown in Formula 1 if the temperature, pH, and other conditions change.

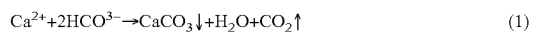
$$Ca^{2+}+2HCO^{3-} \rightarrow CaCO_3\downarrow+H_2O+CO_2\uparrow \qquad (1)$$

In the present embodiment, therefore, the heat exchanger 1 includes a function to suppress the reduction in heat exchange efficiency caused by the above precipitates even when geothermal power generation is conducted for extended periods using hot spring water as a thermal fluid.

<Purification During Heat Exchange>

Figure 3:
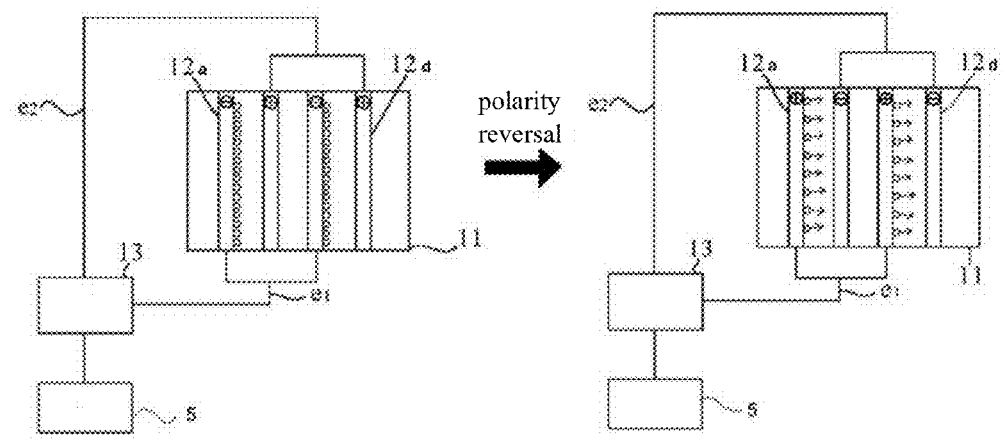
FIG. 3(a) is a figure for explaining the depuration of the heat exchanger, (b) is a figure for showing the relation between concrete washing processing time and the reversal processing in each electrode.
Figure 3:
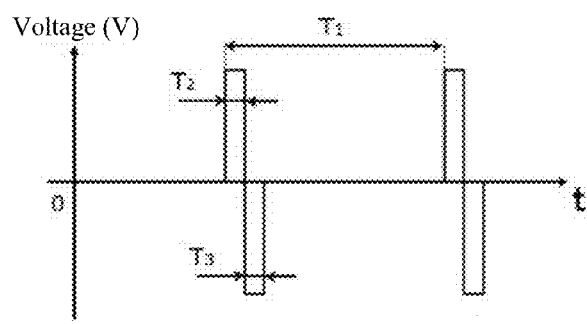

That is, in the present embodiment, the control section 13 of the heat exchanger 1 performs polarity reversal adapted to reverse the polarity of the anode and cathode plates at given times as illustrated in FIGS. 3A and 3B.

More specifically, when the polarity of the anode and cathode plates is reversed by the control section 13 as illustrated in FIG. 3A, deposits (e.g., calcium) adhering to the cathode plates dissolve into cleaning water. At this time, ingredients such as calcium begin to deposit anew on the electrode plates serving as cathode plates. However, it is possible to ensure that deposits dissolve into cleaning water more than deposit on the cathode plates by refining the cleaning process including the polarity reversal, thus purifying the electrode plates as a whole.

At the time of the polarity reversal, the control section 13 may switch the water supply from hot spring water to cleaning water using a valve Vb such as three-way valve provided in the first pipe $L_1$, thus supplying cleaning water to the heat exchanger 1. Further, cleaning water used for cleaning may be discharged, for example, into a river via a discharge pipe connected separately to the heat exchanger 1 or supplied to a hot spring facility. After cleaning water has been supplied for a given period of time, the valve Vb such as three-way valve provided in the first pipe $L_1$ before and after the heat exchanger 1 may be switched back to the original position to resume power generation.

Cleaning water used for cleaning includes high concentrations of minerals, and basically no harmful substances are added. Therefore, cleaning water may be used as commercial hot spring water or drinking water. It should be noted that there are no limitations on cleaning water. In the present embodiment, however, tap water is, for example, used. On the other hand, a discharge pipe used to discharge cleaning water may be omitted. In this case, the first pipe $L_1$ connecting the heat exchanger 1 and a river, for example, may be used in an as-is manner.

As predetermined times, on the other hand, arbitrary times such as every other hour, every other day, every other week, every other month, or every other half year may be specified, and it is preferred to consider the amount of hot spring water supplied to the heat exchanger 1, the flow rate thereof, and other factors. For example, when hot spring water was caused to flow through the first pipe $L_1$ at a rate of about 1 m/second, 0.1 mm-thick precipitation was observed in about 30 minutes.

On the other hand, the period of time during which cleaning water is supplied may be determined in accordance with given times. If there is a long period of time between polarity reversal sessions, it is preferred to supply cleaning water for a long period of time.

As an example, a specific relationship between cleaning time and polarity reversal for each electrode is shown in FIG. 3B. It should be noted that FIG. 3B illustrates the manner in which the cathode plate $12_a$, for example, is energized.

As illustrated in FIG. 3B, the cathode plate is not energized constantly in the present embodiment, thus performing cleaning at given time intervals $T_1$ for saving power consumption and providing improved cleaning efficiency. It should be noted that although there are no specific limitations on the time intervals $T_1$, the present example will be described assuming, for example, that the time intervals $T_1$ are every three hours. In the present example, a positive voltage is applied to the cathode plate $12_a$ only for a period $T_2$, followed by polarity reversal and application of a negative voltage only for a period $T_3$ in one cleaning session.

It should be noted that, in the present embodiment, each of the periods $T_2$ and $T_3$ is 30 seconds long. However, there are no specific limitations on the lengths of these periods, and the lengths thereof may be other than 30 seconds. Further, different durations may be specified for the periods $T_2$ and $T_3$. Still further, although the period $T_3$ begins immediately after the period $T_2$, the present embodiment is not limited thereto. Instead, there may be a period between the periods $T_2$ and $T_3$ during which no voltage is applied.

Thus, in the present embodiment, the control section 13 may apply a voltage to the cathode plate and the anode plate such that a period between the cancel of the energization and restart the energization to apply the given voltage is longer than a period in which a given potential and a potential reversing its polarity with respect to the given potential are applied.

The present embodiment conducts electrolysis in a desired manner by controlling the potentials applied to the electrode plates 12 of the heat exchanger 1, thus controlling the amount of precipitation occurring on the surfaces of the electrode plates from hot spring water, the amounts of precipitates that dissolve from the electrode surfaces into cleaning water, and times when these occur. Further, the above precipitates can be removed with inexpensive cleaning water without using any special chemicals. This provides a low-cost and highly efficient binary power generation system using hot spring water.

Second Embodiment

Figure 4:
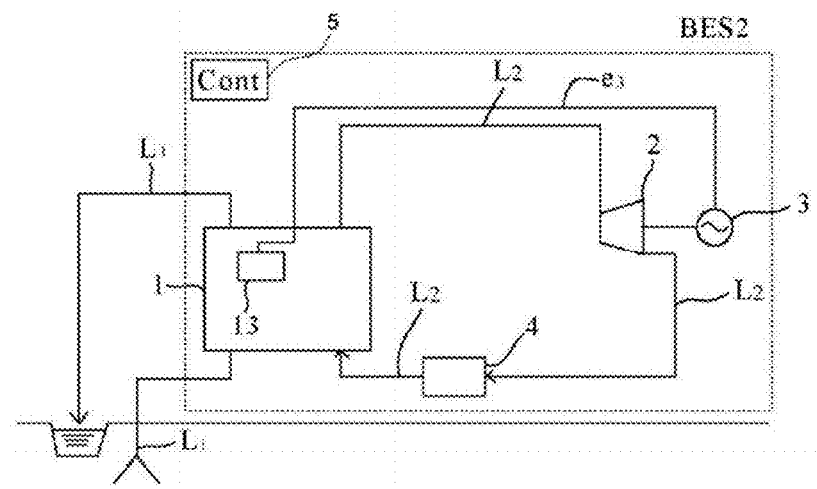
FIG. 4 is a whole block diagram of binary power generating system BES2 that lies in the second embodiment.

FIG. 4 is an overall configuration diagram of a binary power generation system BES2 according to a second embodiment of the present disclosure. The binary power generation system BES2 primarily differs from the binary power generation system BES1 described above in configurations of the generator 3 and the heat exchanger 1. Therefore, only the differences therebetween will be described. The elements having the same configurations and functions as their counterparts of the binary power generation system BES1 will be denoted by the same reference symbols as in the first embodiment, and the description thereof will be omitted.

As illustrated in FIG. 4, part of power generated by the generator 3 is introduced into the heat exchanger 1 via a wire e3 in the binary power generation system BES2 according to the second embodiment. More specifically, the control section 13 of the heat exchanger 1 receives part of power generated by the generator 3 and uses it to apply a potential to the electrode plates 12 (cathode and anode plates).

The present embodiment takes advantage of power generated by the generator 3 to apply a potential to the electrode plates 12 of the heat exchanger 1 without having available a special power source for that purpose, thus contributing to simplification of the devices and system and keeping down the device cost and energy cost.

Third Embodiment

Figure 5:
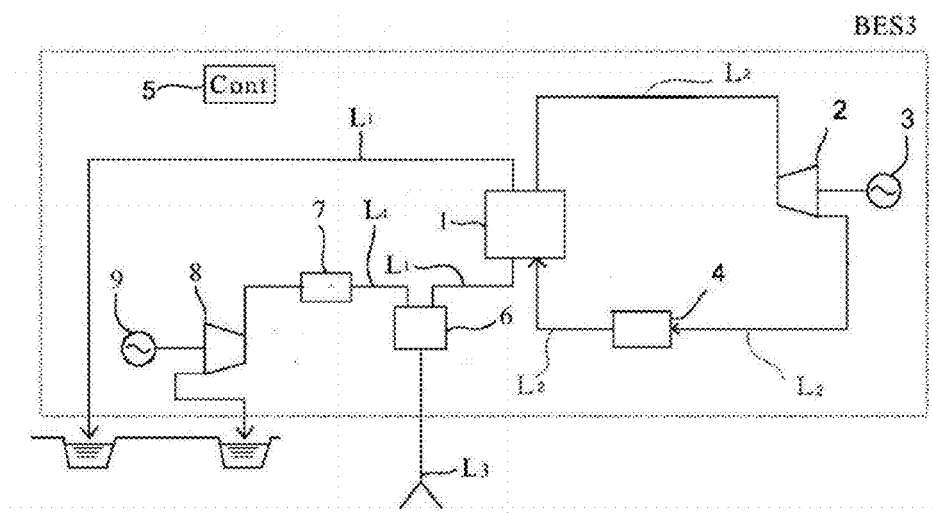
FIG. 5 is a whole block diagram of binary power generating system BES3 that lies in the third embodiment.

FIG. 5 is a whole block diagram of binary power generating system BES3 that lies in the third embodiment. Because binary power generating system BES3 is chiefly different in terms of the composition of decompression vapor-liquid splitter 6, steam addition and subtraction valve 7, the second steam turbine 8, and the second dynamo 9 as compared to the binary power generating system BES1 in the first embodiment and the binary power generating system BES2 in the second embodiment, only a difference is explained in detail below and the explanation of the elements having same number and the same composition or the same function of the aforementioned binary power generating systems are omitted.

As shown in FIG. 5, a Binary power generating system BES3 in the third embodiment is a power generating system that unites a so-called flash type geothermal power generation system and a binary power generating system.

More concretely, the 3rd pipe L3 that draws up a thermal fluid as the first liquid is connected with the decompression vapor-liquid splitter 6. Further, the decompression vapor-liquid splitter 6 is connected to the steam addition-subtraction valve 7 through the 4th pipe L4 and to the heat exchanger 1 through the 1st pipe L1, respectively. Among these, the steam addition-subtraction valve 7 is connected with the second steam turbine 8 through the 4th pipe L4.

Moreover, the second steam turbine 7 is connected with the second dynamo 9 and the 4th pipe L4 as an exhaust tube, respectively. In this embodiment, high-pressure underground water which exists comparatively in the depth is used as a thermal fluid.

The high-pressure underground water supplied to the decompression vapor-liquid splitter 6 through the 3rd pipe L3 is first decompressed and, then, separated to a high-pressure steam and a high-pressure hot water. As for high-pressure steam separated by the decompression vapor-liquid splitter 6, desired electric power is generated with the second dynamo 9 by work of the high-pressure steam sent to the second steam turbine 8 through the steam addition-subtraction valve 7. And then, a low-pressure steam after the work in the second steam turbine 8 is discharged (reduced) to a river through a pipe.

On the other hand, the binary power generation explained in the above-mentioned embodiments is executed by sending the high-pressure hot water separated by the decompression vapor-liquid splitter 6 to the heat exchanger 1 through the 1st pipe L1.

Because a part of the component of the magma exists as an ion in the high-pressure hot water of this embodiment, it is thought that rare metals contained in the magma is precipitated at a surface of the electrode board 12 of the heat exchanger 1.

Thus, in case that nonferrous metals such as the rare metal precipitates at the surface of the electrode board 12 of the heat exchanger 1, the electrode board 12 with the rare metals can be changed and the gathered rare metal can be used for an industrial use.

According to this embodiment, blocking the heat exchanger 1 and the pipe can be controlled without using a special medicine to wash, and then decrease of the heat exchange efficiency can be controlled. In addition, because power generation that uses the heat exchange in two stages is carried out, a big electric power can be gained. Moreover, valuable nonferrous metals such as rare metals can be gathered according to circumstances.

Fourth Embodiment

Figure 6:
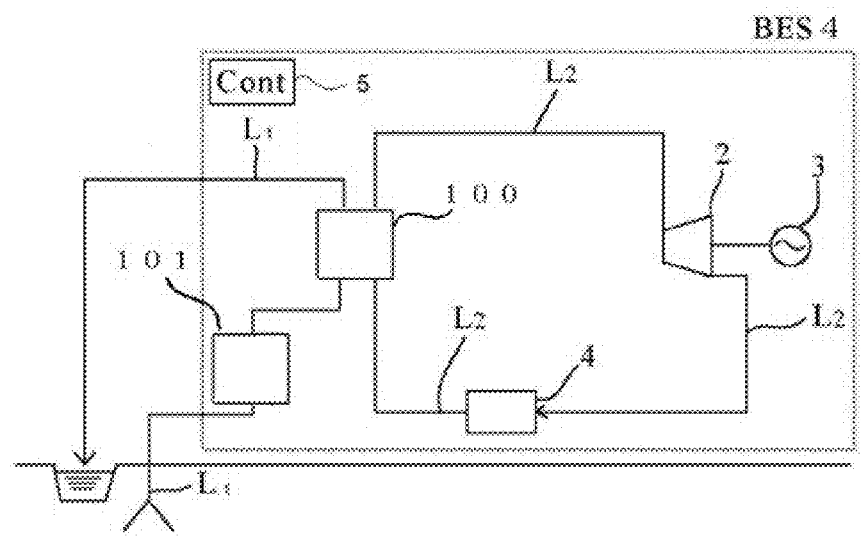
FIG. 6(a) is a whole block diagram of binary power generating system BES4 that lies in the fourth embodiment, (b) is a block diagram that lies washing device 101 of binary power generating system BES4.
Figure 6:
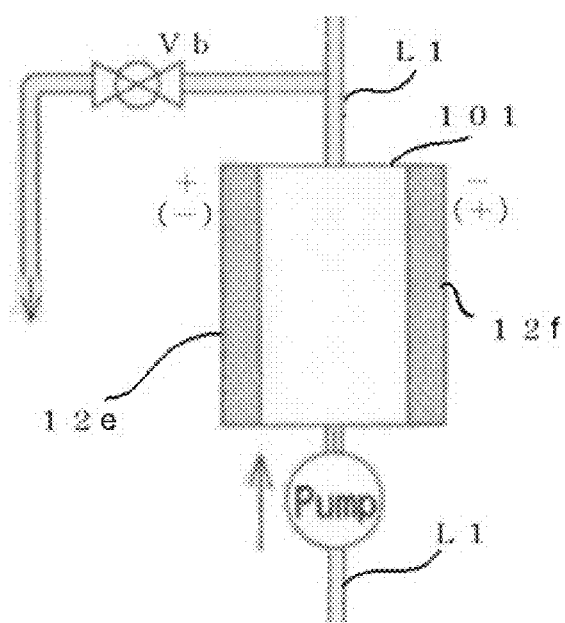

FIG. 6(a) is a figure where the binary power generating system BES4 that lies in the fourth embodiment is shown. As for the binary power generating system BES4, the point that the purifier is built into the binary power generating system as not heat exchanger 1 but another body is different as compared to the aforementioned binary power generating systems. That is, the heat exchanger 1 has a purifier function in the aforementioned embodiments, and both a heat exchanger and a purifier are configured to provide individually and connected mutually.

Hereafter, only difference points are explained in detail, and the explanation of the elements having same number as the first embodiment and the same composition or the same function of the aforementioned binary power generating system are omitted.

The system into which the purifier in this embodiment is built may apply other well-known systems that use the fluid other than the power generating system and the binary power generating system.

As shown in FIG. 6(a), the Binary power generating system BES4 in this embodiment comprises the heat exchanger 100 and washing device 101. The geothermal water as the first fluid sucked up underground flows in the heat exchanger 100 through the 1st pipe L1 and the washing device 101. In other words, the washing device 101 lies between a heat water source and the heat exchanger 100 connected through the 1st pipe L1, and the first fluid (geothermal water) washed by the washing device 101 flows into the heat exchanger 100.

FIG. 6(b) shows a detailed composition of the washing device 101 in this embodiment.

The Electrode board 12e and the electrode board 12f are arranged respectively in vessel 102 as an electrolytic bath, and a part of the flow path to which the geothermal water circulates is formed by the electrode board 12e and electrode board 12f in the washing device 101. The electrode board 12e performs as an anode and the electrode board 12f performs as a cathode in the initial state. And, after prescribed time passes from the start of the system operation, the washing processing such as an inversion operation of the electrode, as explained in the first embodiment, is executed.

During the washing processing, the geothermal water may discharge outside the system without sending the geothermal water to the heat exchanger 100 through the valve Vb. Moreover, other fluid such as a tap water can be used other than the geothermal water as a washing water during the washing processing.

Moreover, though two pieces of electrode boards is used for the electrode board 12 in the aforementioned embodiments, it is needless to say that an electrode board 12 other than two pieces like four pieces can be used as the electrode board 12.

Fifth Embodiment

Figure 7:
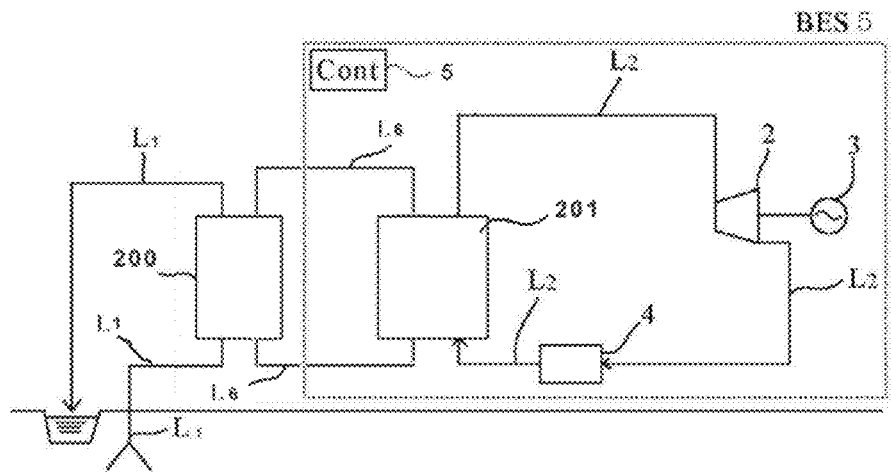
FIG. 7 is a whole block diagram of binary power generating system BES5 that lies in the fifth embodiment.

FIG. 7 is a figure where binary power generating system BES5 that lies in the fifth embodiment is shown.

As for the binary power generating system BES5, the point that the heat exchanger of this embodiment has two step of the first heat exchanger 200 and the second heat exchanger 201 composition is chiefly different as compared to the aforementioned binary power generating systems.

Hereafter, only difference points are explained in detail, and the explanation of the elements having same number as the first embodiment and the same composition or the same function of the aforementioned binary power generating system are omitted.

The binary power generating system including the second heat exchanger 201 in this embodiment may apply a well-known binary power generating system or other well-known systems except the binary power generating system.

As shown in FIG. 7, the power generating system in this embodiment has the first heat exchanger 200 in addition to the binary power generating system BES5 including the second heat exchanger 201. It is configured to circulate a middle fluid (for instance, a purified water) between the second heat exchanger 201 and the first heat exchanger 200 through the 6th pipe L6. As the 6th pipe L6 is a closed loop structure, foreign matters are not mixed easily from the outside.

Moreover, the aforementioned second fluid (for instance, a pentane etc.) flows into the second heat exchanger 201 through the 2nd pipe L2, and then a heat exchange between the second fluid (pentane etc.) and the middle fluid (purified water etc.) that flows in the 6th pipe L6 is carried out.

On the other hand, the aforementioned structure of the heat exchanger 11 can apply to the structure of the first heat exchanger 200. That is, as shown in FIG. 2 for instance, a structure in which the first fluid (geothermal water etc.) flows into a flow path R1 from the 1st pipe L1 while the middle fluid (purified water etc.) flows through the 6th pipe L6 into a flow path R2 divided against the flow path R1 by electrode 12a-12d.

As a result, the heat exchange will be done between the middle fluid (purified water etc.) that flows in the first heat exchanger 200 through the 6th pipe L6 and the first fluid (geothermal water etc.) that flows in the first heat exchanger 200 through the 1st pipe L1.

The middle fluid circulated in the 6th pipe L6 is not limited to the purified water, and a properly well-known other fluid (liquid or gas etc.) can be used if its boiling point is higher than the second fluid and lower than the first fluid.

Moreover, the explanation of washing processing using electrodes 12a-12d is omitted because it is similar to the washing processing mentioned above.

Moreover, it is needless to say that the binary power generating system BES5 can built in the first heat exchanger 200 as one unit, though the binary power generating system BES5 and the first heat exchanger 200 are configured to provide individually in this embodiment.

According to this embodiment, as for the first fluid with the possibility of the precipitation or extraction doesn't circulate in the binary power generating system BES5, the fluid (It is a purified water and pentane in this embodiment) that circulates in the binary power generating system BES5 is always kept a clean state.

Therefore, because only the first heat exchanger 200 which is comparatively small-scale has to be cleaned, the power generating system of this embodiment can require relatively a very little maintenance.

Note that the first to fifth embodiments described above can be said to provide the following features:

(I) a heat exchanger includes an electrolytic bath and a control section.

The electrolytic bath has first and second channels. A first fluid can flow through the first channel. A second fluid adapted to exchange heat with the first fluid can flow through the second channel. At least part of the first and second channels of the electrolytic bath is partitioned by anode and cathode plates to which a given potential is applied from a power source.

The control section applies the given potential to the anode and cathode plates and performs polarity reversal adapted to reverse the polarity of the anode and cathode plates after having applied the given potential at given time intervals.

(II) The plurality of anode and cathode plates are preferably arranged alternately and opposed to each other within the electrolytic bath in the heat exchanger described in feature (I).

(III) A binary power generation system includes the heat exchanger of feature (I) or (II) and a controller adapted to control the power source.

The controller reverses the polarity of the anode and cathode plates at given times.

(IV) The binary power generation system of feature (III) preferably includes an ammeter adapted to measure the current flow between the anode and cathode plates. Also, the controller preferably reverses the polarity on the basis of the reading of the ammeter.

(V) The binary power generation system of feature (III) or (IV) preferably includes a manometer adapted to measure the pressure of steam produced from the second fluid. Also, the controller preferably reverses the polarity on the basis of the reading of the manometer.

(VI) The binary power generation system of any one of features (III) to (V) preferably includes a thermometer adapted to detect the temperature of the first fluid flowing into and out of the electrolytic bath. Also, the controller preferably reverses the polarity on the basis of the reading of the thermometer.

(VII) The binary power generation system of any one of features (III) to (VI) preferably includes a first steam turbine and a power supply system. The first steam turbine is driven by a medium steam produced as a result of evaporation of the second fluid. The power supply system electrically connects the first steam turbine and the anode and cathode plates. Also, the controller preferably uses at least part of power generated by the first steam turbine as the power source.

(VIII) The binary power generation system of feature (VII) preferably further includes a decompression gas-liquid separator and a second steam turbine. The decompression gas-liquid separator decompresses the first fluid to separate it into water vapor and thermal water. The second steam turbine is driven by the water vapor separated by the decompression gas-liquid separator.

(IX) The binary power generation system of any one of features (III) to (VIII) preferably further includes a discharge pipe. The discharge pipe is connected to the heat exchanger or a first pipe through which the first fluid flows after passing through the heat exchanger. The first fluid can flow through the discharge pipe after reversal of the polarity of the anode and cathode plates.

(X) The binary power generation system of feature (IX) preferably includes a valve adapted to switch between the discharge pipe and the first pipe. Also, the controller preferably switches the valve at the time of reversal of the polarity of the anode and cathode plates so as to cause the thermal fluid, introduced into the heat exchanger, to flow into the discharge pipe.

(XI) A heat exchanger control method includes causing a first fluid to flow into a heat exchanger via a first pipe. The heat exchanger has anode and cathode plates to which a given potential is applied from a power source. The first fluid flows into the heat exchanger in such a manner as to come into contact with the cathode plates.

The heat exchanger control method further includes causing a second fluid to flow into the heat exchanger via a second pipe. The second fluid exchanges heat with the first fluid. The second fluid flows into the heat exchanger in such a manner as to be isolated from the first fluid.

The heat exchanger control method further includes applying the given potential to the anode and cathode plates and performing polarity reversal adapted to reverse the polarity of the anode and cathode plates after having applied the given potential at given time intervals.

Sixth Embodiment

Figure 8:
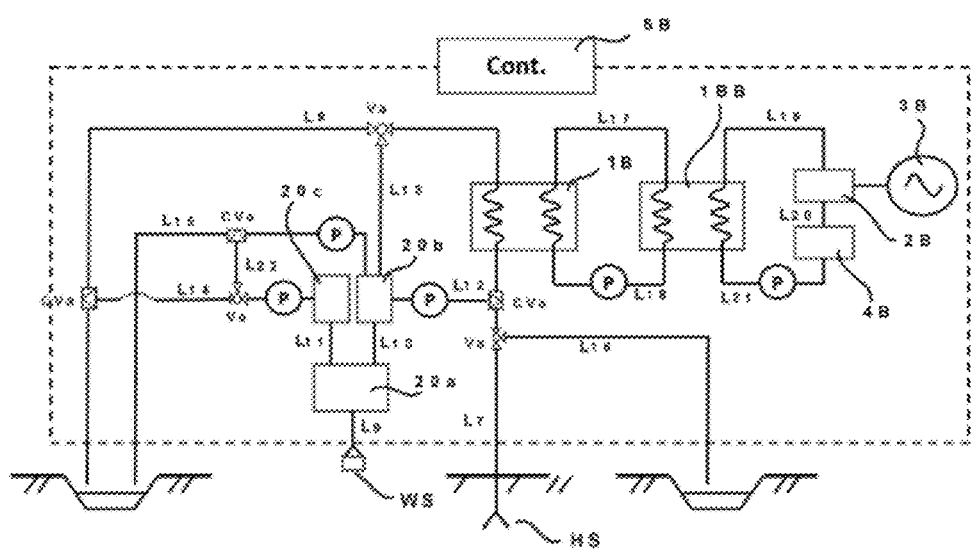
FIG. 8 is a whole block diagram of a purifier and a heat exchanging system including the purifier that lies in the sixth embodiment.

FIG. 8 is an overall configuration diagram of a purifier and a heat exchange system including the purifier according to a sixth embodiment of the present disclosure.

The heat exchange system in the present embodiment includes a vessel and a controller. The vessel is connected to a channel through which a thermal fluid flows. An anode and a cathode are arranged to be opposed within the vessel, with a space formed between the anode and the cathode. The controller applies a voltage between the anode and the cathode with a given liquid provided in the space. The controller stores electrolyzed water produced by applying the voltage to the given liquid and, at the same time, supplies at least part of the electrolyzed water to the channel.

As a more specific configuration, the heat exchange system includes first to sixteenth pipes L7 to L22, a heat exchanger 1B, an auxiliary heat exchanger 1BB, a steam turbine 2B, a generator 3B, a condenser 4B, a purifier 20 (20a, 20b, and 20c), and a controller 5B. It should be noted that known power generation systems described, for example, in Japanese Patent Laid-Open Nos. 2013-170553, 2014-181697, and 2005-337060 may be referred to for the configuration other than that which will be described in detail.

In the present embodiment, the purifier 20 includes the electrolyzed water production bath 20a, the acidic water tank 20b, the alkaline water tank 20c, and pipes L (e.g., L9, L10, and L11). A liquid is supplied to the purifier 20, for example, from a water source WS via pumps which are not shown. Then, the purifier 20 can produce electrolyzed water by electrolyzing the liquid supplied from the water source WS and store produced electrolyzed water.

The water source WS is separate from a thermal fluid source HS which will be described later. The water source WS is, for example, a service water system. That is, in the present embodiment, water is supplied to the electrolyzed water production bath 20a from a service water system via the pipe L9.

It should be noted that a detailed description will be given later of the structure of the purifier 20 and the cleaning process.

The heat exchanger 1B is connected to the thermal fluid source HS via the first pipe L7 and returns (discharges) the thermal fluid, which has exchanged heat with a working fluid which will be described later, for example, to a river via the second pipe L8. It should be noted that, in the present embodiment, the sixth pipe L12 is connected to the first pipe L7 via a check valve CVa and that the tenth pipe L16 is connected to the first pipe L7 via a valve Va (preferably, a three-way valve, and such a valve is used as the valve Va unless otherwise specified). That is, a thermal fluid from the thermal fluid source HS can selectively flow into the heat exchanger 1B side and the return (discharge) side via the valve Va provided in the first pipe L7.

Further, the thermal fluid whose heat has been exchanged by the heat exchanger 1B may be not discharged and may be reused.

Here, there are no specific limitations on the "thermal fluid source HS" and a "thermal fluid" in the present embodiment. For example, however, a hot spring well is used as the thermal fluid source HS, and hot spring water at a temperature of about 50° C. to 150° C. welled up from the hot spring well is used as a thermal fluid. It should be noted that industrial wastewater (waste hot water arising from industrial process such as hot water cleaning) and high-pressure underground water used in geothermal power generation in related art (these will be collectively referred to as "thermal water" as appropriate) are among thermal fluids which can be used in the present embodiment in addition to hot spring water described above.

The auxiliary heat exchanger 1BB is connected to the heat exchanger 1B via the eleventh and twelfth pipes 17 and 18, a pump P, and so on, and to the steam turbine 2B via the thirteenth pipe L19 and so on. Further, the auxiliary heat exchanger 1BB is connected to the condenser 4B via the fifteenth pipe L21, the pump P, and so on.

The auxiliary heat exchanger 1BB is designed to keep down contamination impacts caused by the thermal fluid obtained from the thermal fluid source HS, exchanging heat with the heat exchanger 1B (thermal fluid) using an auxiliary fluid including slight amounts of impurities and further permitting heat exchange between the auxiliary fluid that has obtained energy from the above heat exchange and a working fluid. Hence, in the present embodiment, pure water in a gas phase (gas-liquid mixture) and that in a liquid phase flow in the eleventh and twelfth pipes L17 and L18 as auxiliary fluids individually. Further, a working fluid in a gas phase (gas-liquid mixture) or in a liquid phase flows through each of the thirteenth to fifteenth pipes L19 to L21. It should be noted that an auxiliary fluid is not limited to pure water and that other fluid (e.g., liquid with reduced amounts of minerals) may also be used.

Further, the auxiliary heat exchanger 1BB may be omitted as appropriate. In that case, the heat exchanger 1B is connected to the steam turbine 2B via the thirteenth pipe L19 and so on and to the condenser 4B via the fifteenth pipe L21 and so on.

A known turbine used for so-called binary power generation can be used as the steam turbine 2B. Steam of the working fluid produced by the auxiliary heat exchanger 1BB flows into the steam turbine 2B via the thirteenth pipe L19.

Here, there are no specific limitations on the "working fluid" in the present embodiment except that a fluid lower in boiling point than the thermal fluid is used. Various fluids such as butane ($C_4H_{10}$) and CFC substitutes (HFE) can be used. In the present embodiment, pentane ($C_5H_{12}$) having a boiling point at about 36° C. is used as a working fluid. That is, pentane as a working fluid receives heat from an auxiliary fluid (e.g., pure water) within the auxiliary heat exchanger 1BB, evaporating into a gas phase (or gas-liquid mixture) state and being introduced into the steam turbine 2B via the thirteenth pipe L19.

A known generator used for binary power generation can be used as the generator 3B. The generator 3B is connected to the steam turbine 2B, generating power on the basis of steam of the working fluid flowing into the steam turbine 2B. Power generated by the generator 3B is supplied to substations of electric utilities, homes, and so on via transformers which are not shown.

A known condenser used for binary power generation can be used as the condenser 4B. The condenser 4B is connected to the steam turbine 2B via the fourteenth pipe L20. Then, the condenser 4B condenses (conducts heat exchange of) a working fluid (e.g., pentane) in steam form that has gone through the steam turbine 2B using water or air, transforming the fluid into one in liquid form. Then, the transformed working fluid in liquid form is introduced again into the auxiliary heat exchanger 1BB via the fifteenth pipe L21, the pump P, and so on.

The controller 5B is, for example, a personal computer (PC) that incorporates a central processing unit (CPU) and a display that is not shown. The controller 5B controls the devices making up the heat exchange system in a centralized manner. Further, the controller 5B has a function to perform a cleaning process (described in detail later) at given times. The cleaning process includes first and second purification modes which will be described later.

This allows an operator to proceed with the cleaning process and other tasks under control of an overall controller 7 via the display screen and an input device that is not shown.

A description will be given next of a detailed structure of the purifier 20 according to the present embodiment with reference to FIGS. 9 and 10.

Figure 9:
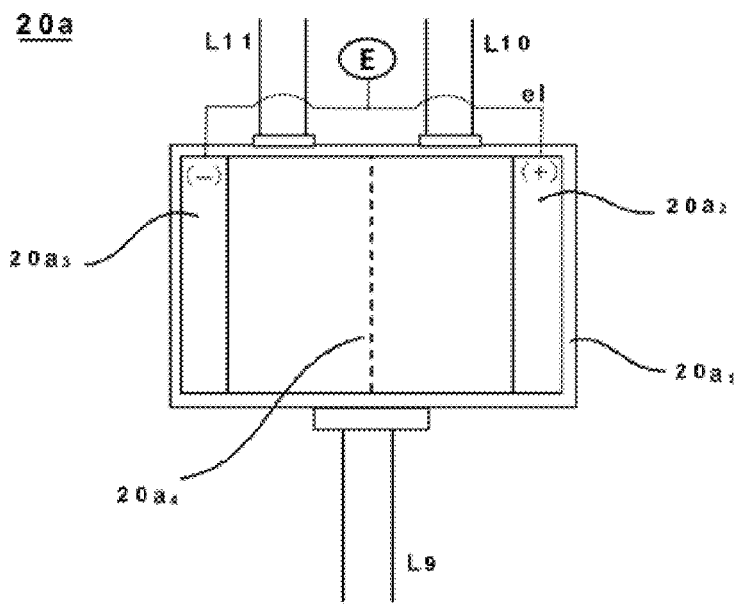
FIG. 9 is a block diagram of the purifier that lies in the sixth embodiment.

FIG. 9 illustrates the structure of the electrolyzed water production bath 20a as a first vessel of the purifier 20 according to the present embodiment. As is clear from FIG. 9, the electrolyzed water production bath 20a includes a vessel $20a_1$, an anode $20a_2$, a cathode $20a_3$, and a diaphragm $20a_4$.

The vessel $20a_1$ is, for example, a hollow structure made of a metal or resin coated with an insulating material, housing the anode $20a_2$, the cathode $20a_3$, the diaphragm $20a_4$, and so on. It should be noted that the vessel $20a_1$ may be covered with a thermal insulating material to suppress the entry and exit of external heat.

Further, the third to fifth pipes L9 to L11 are connected to the vessel $20a_1$. A given liquid flows into or out of the vessel $20a_1$ via these pipes.

More specifically, the water source WS and the vessel $20a_1$ are connected via the third pipe L9, a pump that is not shown, and so on. The acidic water tank 20b and the vessel $20a_1$ are connected via the fourth pipe L10. The alkaline water tank 20c and the vessel $20a_1$ are connected via the fifth pipe L11.

Each of electrode bodies including the anode $20a_2$ and the cathode $20a_3$ has a plate-shaped structure in the present embodiment, with a desired voltage applied between the electrode bodies via a commercial power source E and a wire e1. Then, the anode $20a_2$ and the cathode $20a_3$ are arranged to be opposed to each other within the vessel $20a_1$, with a space provided therebetween.

It should be noted that general-purpose metals such as iron and copper, corrosion-resistant precious metals such as platinum and gold, and carbon that is industrially inexpensive and stable are used as electrode bodies.

Further, in the present embodiment, the surfaces of the anode $20a_2$ and the cathode $20a_3$ opposed to each other are planar in shape. However, the present embodiment is not limited thereto, and the surfaces thereof may be in the shape of waves. Alternatively, the surfaces thereof may be in the shape of bumps and dips. It should be noted that if the surfaces are in the shape of waves or bumps and dips, the waves or the bumps and dips are preferably approximately in phase so that the opposed faces are at the same distance.

The diaphragm $20a_4$ is arranged between the anode $20a_2$ and the cathode $20a_3$ within the vessel $20a_1$. The diaphragm $20a_4$ is a member adapted to partition the vessel $20a_1$ into two spaces, one in which the anode $20a_2$ is arranged and another in which the cathode $20a_3$ is arranged, with ions and electrons allowed to move from one space to the other. A known membrane such as solid polymer electrolyte membrane is used as the diaphragm $20a_4$.

Therefore, water flowing into the spaces of the vessel $20a_1$ from the water source WS is electrolyzed as a result of application of a voltage to the electrode bodies under control of the controller 5B, thus producing electrolyzed water within the vessel $20a_1$. More specifically, acidic water is produced in the space between the diaphragm $20a_4$ and the anode $20a_2$ of the vessel $20a_1$, whereas alkaline water is produced in the space between the diaphragm $20a_4$ and the cathode $20a_3$ of the vessel $20a_1$.

It should be noted that the purifier 20 according to the present embodiment may be not necessarily controlled by the controller 5B. Instead, the purifier 20 may be controlled by a controller arranged separately from the controller 5B.

Figure 10:
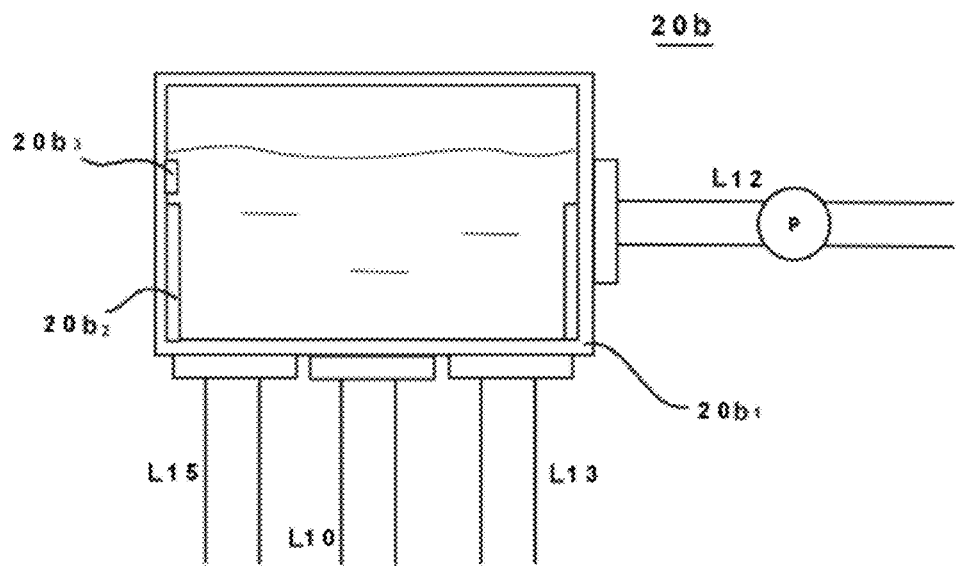
FIG. 10 is a block diagram of the acid water tank that lies in the sixth embodiment.

Next, FIG. 10 illustrates a detailed structure of the acidic water tank 20b as a second vessel according to the present embodiment.

As is clear from FIG. 10, the acidic water tank 20b according to the present embodiment includes a vessel $20b_1$, a temperature regulator $20b_2$, a temperature sensor $20b_3$, and so on. It should be noted that the temperature regulator $20b_2$ and the temperature sensor $20b_3$ may be not typically necessary and may be omitted as appropriate. Then, acidic water is supplied to the vessel $20b_1$ from the electrolyzed water production bath $20a$ via the fourth pipe L10, thus storing a given quantity of acidic water in the vessel $20b_1$.

The vessel $20b_1$ is, for example, a hollow structure made of a metal or resin coated with an insulating material. There are no specific limitations on the volume of the vessel $20b_1$, and the volume thereof can be specified as appropriate in accordance with the scale of the cleaning process which will be described later. For example, if the electrolyzed water production bath $20a$ produces three liters of electrolyzed water per minute, the vessel $20b_1$ preferably has a volume capable of storing about 2000 liters to 5000 liters of electrolyzed water.

Further, the vessel $20b_1$ is connected to the first pipe L7 via the sixth pipe L12, the pump P, the check valve CVa, and so on, thus allowing acidic water (part of electrolyzed water) stored in the vessel $20b_1$ to flow into the first pipe L7.

Still further, the vessel $20b_1$ is connected to the second pipe L8 via the seventh pipe L13, the valve Va, and so on, thus allowing acidic water stored in the vessel $20b_1$ (part of electrolyzed water) to flow into the second pipe L8.

Still further, the vessel $20b_1$ is connected, for example, to a river, the return (discharge) side, via the ninth pipe L15, the pump P, and the check valve CVa, thus allowing used acidic water (having a pH value close to neutral in many cases), stored in the vessel $20b_1$, to be discharged into the river.

The temperature regulator $20b_2$ is, for example, a known heater or cooler adapted to adjust the temperature of acidic water stored in the vessel $20b_1$ to a desired level. For example, the controller 5B may heat acidic water by controlling the temperature regulator $20b_2$ to ensure improved effectiveness of the cleaning process which will be described later.

A known thermocouple, for example, is suitable for use as the temperature sensor $20b_3$. The temperature sensor $20b_3$ detects the temperature of acidic water stored in the vessel $20b_1$. Then, the controller 5B may control the temperature regulator $20b_2$ on the basis of the detection result of the temperature sensor $20b_3$, for example, to ensure improved effectiveness of the cleaning process.

Further, the alkaline water tank $20c$ as a second vessel according to the present embodiment is connected to the electrolyzed water production bath $20a$ via the fifth pipe L11, supplying alkaline water produced by the alkaline water tank $20c$ to the electrolyzed water production bath $20a$. Still further, the alkaline water tank $20c$ is connected to the second pipe L8 via the eighth pipe L14, the pump P, the valve Va, and the check valve CVa. The valve Va provided in the eighth pipe L14 is connected to the check valve CVa provided in the ninth pipe L15 via the sixteenth pipe L22.

The above configuration allows for alkaline water stored in the alkaline water tank $20c$ (part of electrolyzed water) to flow into the second pipe L8 via the eighth pipe L14. The above configuration also allows for alkaline water to flow into the ninth pipe L15 via the eighth pipe L14 and the sixteenth pipe L22.

It should be noted that the structure of the alkaline water tank $20c$ other than the above is the same as that of the acidic water tank $20b$. Therefore, the description thereof will be omitted.

A description will be given next of the purification method according to the present disclosure. It should be noted that the present embodiment is not limited in application to heat exchangers and pipes. Instead, the present embodiment is applicable to various systems, devices, and parts thereof through which a thermal fluid (e.g., hot spring water), some of whose ingredients may precipitate, flows.

<First Purification Mode>

Figure 11:
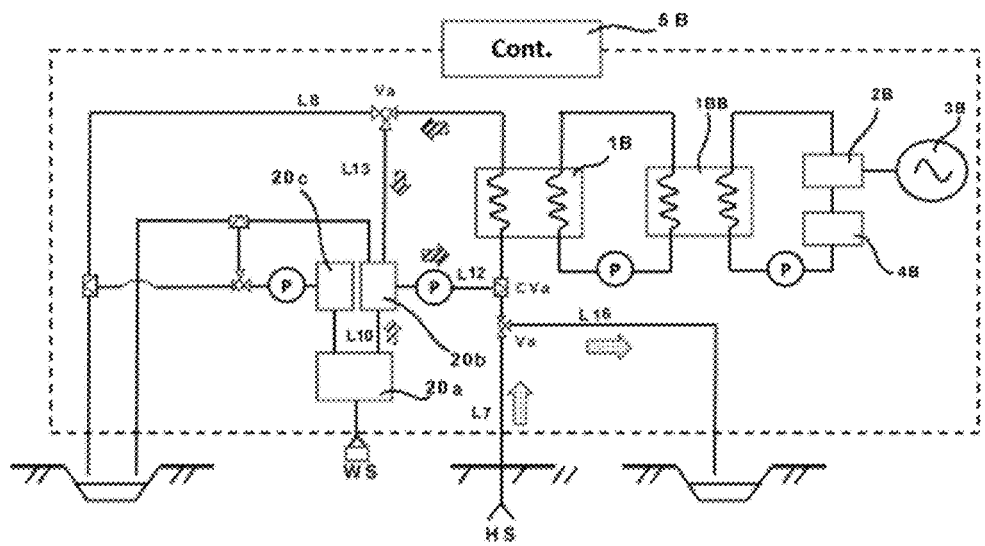
FIG. 11 is a state chart for showing a flow of the fluid when the first purification mode of the purifying methods of this invention is executed.

A description will be given first of a first purification mode of the cleaning process according to the present embodiment with reference to FIG. 11.

In the first purification mode, a thermal fluid from the thermal fluid source HS does not flow into the heat exchanger 1B during cleaning. Instead, the thermal fluid flows from the first pipe L7 into the tenth pipe L16 via the valve Va, being returned, for example, to a river. On the other hand, acidic water stored in the acidic water tank $20b$ flows into the first pipe L7 via the sixth pipe L12, the pump P, and the check valve CVa. It should be noted that heat exchange is halted in the heat exchange system. In the first purification mode, therefore, the working fluid does not make any state transition.

Acidic water that has flowed into the first pipe L7 flows on into the heat exchanger 1B first and then into the second pipe L8. Then, acidic water flows into the seventh pipe L13 via the valve Va and returns to the acidic water tank $20b$. In the present embodiment, this circulation of acidic water is conducted once or repeated a plurality of times under control of the controller 5B, thus allowing precipitates (minerals) that have deposited in the first pipe L7, the heat exchanger 1B, the second pipe L8, and so on to be removed.

It should be noted that the pH value of acidic water stored in the acidic water tank $20b$ is about two to three. As a result of repetition of the above circulation, however, the pH value of acidic water is likely to jump close to seven.

Therefore, the controller 5B may supply new acidic water to the acidic water tank $20b$ from electrolyzed water production bath $20a$ every given period of time (e.g., every several minutes, several tens of minutes, several hours) or each time acidic water is circulated (e.g., every circulation, once every several circulation sessions). This allows for the cleaning process to be continued while at the same time maintaining the purification capability of acidic water during cleaning.

Figure 12:
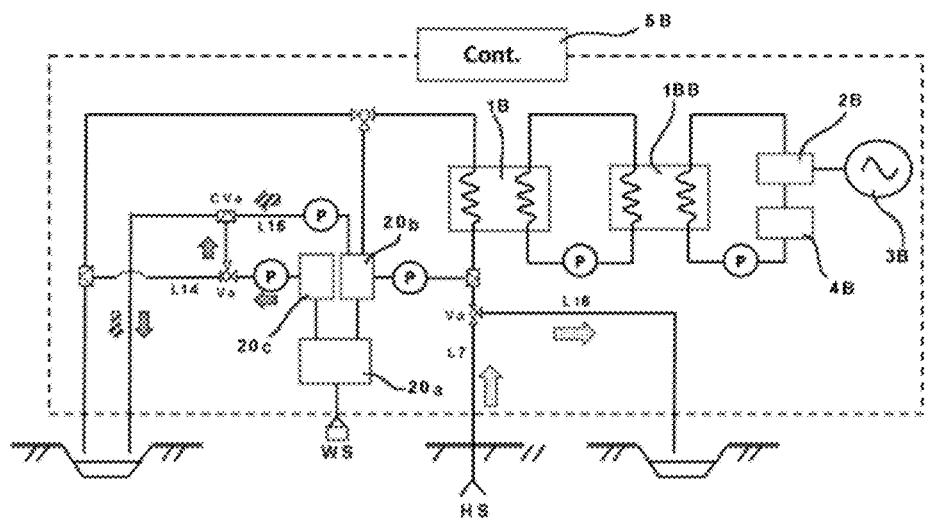
FIG. 12 is a state chart for showing a flow of the fluid when the first purification mode of this invention ends and the acid water is exhausted outside the system.

When the first purification mode is complete, acidic water used for cleaning is discharged as illustrated in FIG. 12.

More specifically, the controller 5B controls the pump P provided in the ninth pipe L15, returning used acidic water stored in the acidic water tank $20b$, for example, to a river via the ninth pipe L15. At this time, the controller 5B simultaneously controls the pump P and the valve Va arranged in the eighth pipe L14, adding alkaline water stored in the alkaline water tank $20c$ into the ninth pipe L15 via the eighth pipe L14 and the sixteenth pipe L22.

This allows used acidic water flowing through the ninth pipe L15 to be returned, for example, to a river after being neutralized by alkaline water supplied via the sixteenth pipe L22 and the check valve CVa. As a result, it is possible to suppress highly acidic water from flowing into a discharge destination such as river without being treated, thus preventing environmental pollution.

It should be noted that a known pH detector may be further provided at the end of the ninth pipe L15 so that the controller 5B controls the amount of alkaline water added into the ninth pipe L15 on the basis of the detection result of the pH detector.

Further, a thermal fluid that flows from the first pipe L7 into the tenth pipe L16 and is returned, for example, to a river, may be used as a temperature regulating fluid. More specifically, this thermal fluid to be returned may be used, for example, near the fourth pipe L10, the sixth pipe L12, or the acidic water tank 20b, to regulate the temperature (to heat) these members.

In the first purification mode described above, electrolyzed water produced and stored by electrolyzing water from the water source WS, inexpensive water which can be supplied in large quantities, is used for cleaning. This makes it possible to conduct the cleaning process in a clean and inexpensive manner without using any special chemicals. Further, the cleaning process is performed using only acidic water in the first purification mode. Moreover, before being discharged externally, acidic water is neutralized with alkaline water, thus suppressing environmental impacts on rivers and so on.

<Second Purification Mode>

A description will be given next of a second purification mode of the cleaning process according to the present embodiment with reference to FIG. 13.

The second purification mode is characterized in that electrolyzed water produced by electrolysis within the purifier 20 is added to the thermal fluid at given time intervals under control of the controller 5B. In other words, it can be said that the first purification mode is an offline mode designed to perform the cleaning process with heat exchange halted, whereas the second purification mode is an online mode designed to perform the cleaning process while at the same time continuing heat exchange.

That is, a liquid (water) is supplied to the purifier 20 from the water source WS in advance via the third pipe L9, a pump that is not shown, and so on, thus applying a given potential between the anode $20a_2$ and the cathode $20a_3$ via the commercial power source E under control of the controller 5B and producing electrolyzed water. Electrolyzed water thus produced is stored in the acidic water tank 20b if it is acidic water, and in the alkaline water tank 20c if it is alkaline water.

It should be noted that if acidic water can be supplied in time, production of electrolyzed water may be initiated simultaneously when the heat exchange system starts heat exchange.

Figure 13:
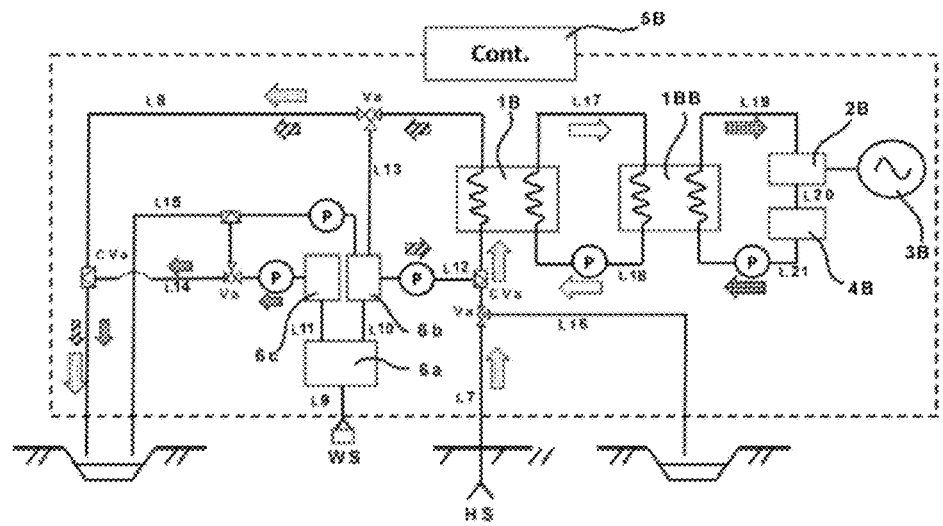
FIG. 13 is a state chart for showing a flow of the fluid when the second purification mode of the purifying methods of this invention is executed.

When the heat exchange system starts heat exchange, the thermal fluid (hot spring water) is pumped from the thermal fluid source HS such as hot spring well via the first pipe L7, a pump that is not shown, and so on as shown by dotted arrows in FIG. 13, allowing the thermal fluid to flow into the heat exchange 1B and being discharged, for example, to a river through the second pipe L8. Further, in the thermal exchange system, heat is transferred from the thermal fluid (hot spring water) to an auxiliary fluid (pure water), and further from the auxiliary fluid that has received heat to a working fluid by the heat exchanger 1B and the auxiliary heat exchanger 1BB as shown by white and checkered arrows shown in FIG. 13. It should be noted that the manner in which binary power generation is conducted using the working fluid that has exchanged heat with the auxiliary fluid is as described above.

On the other hand, the controller 5B controls the pump P provided in the sixth pipe L12, adding part of acidic water stored in the acidic water tank 20b into the first pipe L7 via the sixth pipe L12 and the check valve CVa at given time intervals. It should be noted that arbitrary times such as every other 10-minute, every other hour, every other day, every other week may be specified as given time intervals, and that the amount of hot spring water supplied to the heat exchanger 1, the flow rate thereof, and other factors are preferably considered. For example, when hot spring water is caused to flow through the first pipe L7 at a rate of about 1 m/second, 0.1 mm-thick precipitation is observed in about 30 minutes. Therefore, if it is desirable to typically maintain the heat exchange system clean, stored acidic water may be added to the thermal fluid, for example, every other thirty minutes. As for the amount of time during which acidic water is supplied, on the other hand, preferably, the longer the time intervals, the longer acidic water should be supplied. Further, when added to the first pipe L7 at the given time intervals, acidic water may be added at the same or varying flow rates (high flow rate at some time and low flow rate at other times) during that period of time.

As described above, acidic water is added to hot spring water flowing through the first pipe L7, thus transforming the hot spring water into a liquid having not only energy necessary for heat exchange with an auxiliary fluid but also a purifying effect. Thus, the thermal water added with acidic water flows into the heat exchanger 1B, exchanging heat with the auxiliary fluid. After this heat exchange, the thermal water added with acidic water flows through the second pipe L8.

Further, the controller 5B controls the pump P provided in the eighth pipe L14, adding a desired amount of alkaline water from the alkaline water tank 20c into the second pipe L8 via the eighth pipe L14 and the check valve CVa.

As a result, the thermal fluid that has turned acidic is neutralized, minimizing external impacts such as those on rivers.

It should be noted that a known pH detector may be further provided at the end of the second pipe L8 so that the controller 5B controls the amount of alkaline water added into the eighth pipe L14 on the basis of the detection result of the pH detector.

In the second purification mode described above, electrolyzed water produced and stored by electrolyzing water from the water source WS, inexpensive water which can be supplied in large quantities, is used for cleaning. This makes it possible to conduct the cleaning process in a clean and inexpensive manner without using any special chemicals. Further, the cleaning process is performed without halting heat exchange in the heat exchange system in the second purification mode, thus suppressing the reduction in power generation. Moreover, before being discharged externally, acidic water is neutralized with alkaline water, thus suppressing environmental impacts on rivers and so on.

Seventh Embodiment

Figure 14:
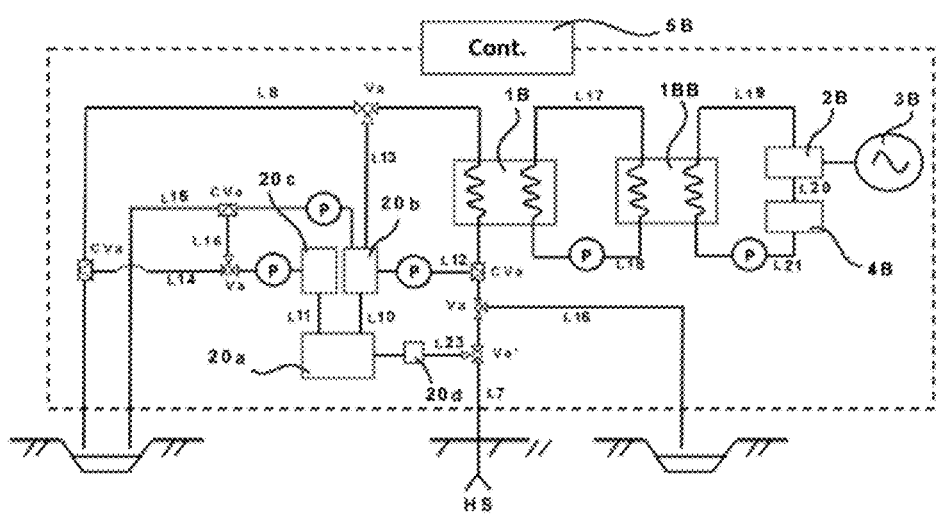
FIG. 14 is a whole block diagram of a purifier and a heat exchanging system including the purifier that lies in the seventh embodiment.

Next, the seventh embodiment of this invention is explained with referring to FIG. 14.

There is chiefly a feature that the system of this embodiment generates an electrolyzed water by supplying a part of the thermal fluid from heat fluid source HS to the purifier 20, though the liquid was supplied from water source WS other than the heat fluid source HS to purifier 20 in the sixth embodiment.

Hereafter, only difference points are explained in detail, and the explanation of the elements having same number and the same composition or the same function of the binary power generating system of the sixth embodiment are omitted.

As shown in FIG. 14, the heat exchanging system in this embodiment comprises a 17th pipe L23 which connects the purifier 20 and the 1st pipe L17, a valve Va' which connects the 17th pipe L23 and the 1st pipe L17, and a flow meter 20d installed in the 17th pipe L23.

The valve Va' is a member which supplies a part of the thermal fluid that flows in the 1st pipe L7 to the 17th pipe L23, and well-known, various valves can be applied.

The flow meter 20d is an equipment which measures a flowing quantity of the fluid (thermal fluid) that flows in the 17th pipe L23, and well-known, various flow meters can be applied.

In this embodiment, a part of the thermal fluid flowing into the 1st pipe L7 via a pump (not shown) from heat fluid source HS is supplied, and rest of the thermal fluid is supplied to the heat exchanger 1B. The controller 5B properly adjusts aperture of the valve Va' based on the detection result of flow meter 20d, and thus, as a result, the controller 5B can adjust the amount of the thermal fluid that flows to the 1st pipe L7 and the 17th pipe L23.

According to this embodiment, because it is possible to generate the electrolyzed water by using a part of the thermal fluid instead of using the water souse WS, the scale of the system can be relatively reduced as compared to the sixth embodiment. Moreover, because the electrolyzed water is generated from the thermal fluid, the generated electrolyzed water (acid water) has high temperature and strong detergency as compared to the sixth embodiment, and thus enable to save warming time and effort in the acid tank 20b.

Eighth Embodiment

Figure 15:
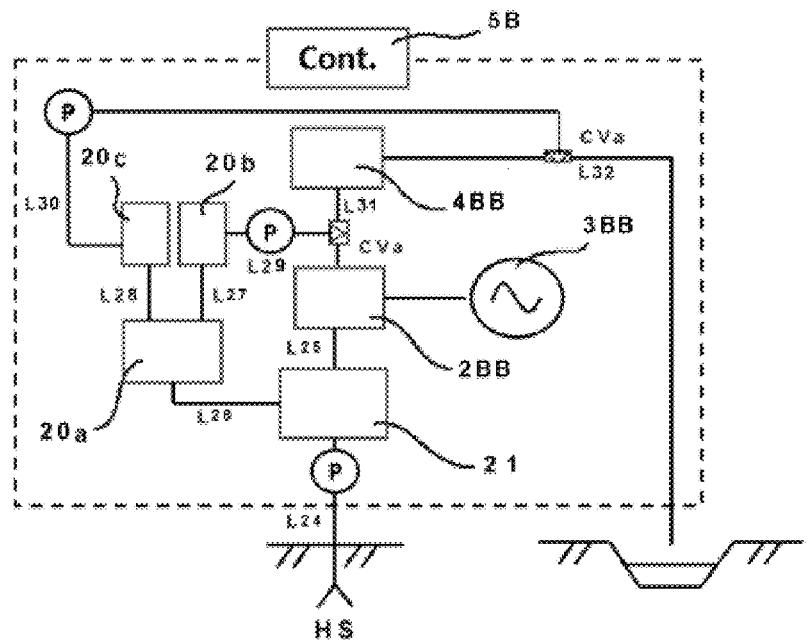
FIG. 15 is a whole block diagram of a purifier and a heat exchanging system including the purifier that lies in the eighth embodiment.

Next, the eighth embodiment of this invention is explained with referring to FIG. 15.

There is chiefly a feature in this embodiment that the system which leads the thermal fluid (state of steam) from heat fluid source HS to the steam turbine generates electricity, while the binary power generation is explained in the sixth and seventh embodiments.

Hereafter, only difference points are explained in detail, and the explanation of the elements having same number and the same composition or the same function as the sixth embodiment and the seventh embodiment are omitted.

As shown in FIG. 15, the heat exchanging system in this embodiment comprises a purifier 20 (20a, 20b, 20c), a controller 5B, a separator 21, a steam turbine 2BB, a dynamo 3BB, a steam condenser 4BB and 18th pipe L24 to 26th pipe L32.

The separator 21 is a device which receives the supply of the thermal fluid from heat fluid source HS through the 18th pipe L24 and pump P etc., and separates the thermal fluid to a steam and a liquid. Various, well-known separators can be applied to the separator 21. More concretely, the separator 21 supplies the separated steam to the steam turbine 2BB through the 19th pipe L25, and supplies the separated liquid (warm water) when steam that separates the strike of the supplied thermal fluid is supplied to the purifier 20 through the 20th pipe L26.

The purifier 20 generates the electrolyzed water by applying an electrolysis reaction to the fluid (thermal fluid) supplied via the separator 21, and collects the generated electrolyzed water.

And, the purifier 20 supplies, under the control of controller 5B, the acid water pooled in the acid water tank 20b in the 25th pipe L31 via the 23th pipe L29 when the first purification mode or the second purification mode is executed. The steam supplied to steam turbine 2BB is used to generate electricity in the dynamo 3BB. And after the used steam is supplied to the steam condenser 4BB via the 25th pipe L31 and converted to a liquid, then the converted liquid is discharged (exhausted) to outside of the system (such as a river) via the 26th pipe L32. At this time, as well as the aforementioned embodiment, the alkaline water pooled in the alkali water tank 20c is supplied in the 26th pipe L32 via the 24th pipe L30, a pump P, and a non-return valve etc.

The 23rd pipe L29 may be connected with other pipe (the 18th pipe L24, the 19th pipe L25, and the 26th pipe L32, etc.), though the 23rd pipe L29 is connected with the 25th pipe L31 via the non-return valve in this embodiment.

According to this embodiment, because cleaning for pipe etc. is done by using the electrolyzed water separated from the thermal fluid, a simplified, clean and low-cost power generating system can be built.

Moreover, the alkaline water may be used according to the object to be purified, though an acid water of the electrolyzed water is used for the cleaning in the above-mentioned embodiments and the transformation example.

The second vessel described above may be not typically necessary. If the first vessel having a large capacity is used, the second vessel may be omitted as appropriate. Alternatively, a third vessel connected to the second vessel may be further provided to increase the amount of electrolyzed water (acidic and alkaline water) stored.

Still alternatively, a water quantity sensor may be provided inside each of the acidic water tank 20b and the alkaline water tank 20c so that the supply of electrolyzed water from the electrolyzed water production bath 20a is continued until a given level is reached.

Note that the sixth to eighth embodiments described above can be said to provide the following features:

(A) A purifier includes a vessel and a controller.

The vessel is connected to a channel through which a thermal fluid flows. An anode and a cathode are arranged to be opposed within the vessel, with a space formed between the anode and the cathode.

The controller applies a voltage between the anode and the cathode with a given liquid provided in the space. The controller stores electrolyzed water produced by applying the voltage to the given liquid first, and then supplies at least part of the stored electrolyzed water to the channel.

(B) In the purifier of feature (A), the vessel preferably includes first and second vessels. The anode and the cathode are arranged inside the first vessel. The second vessel is connected to the first vessel to store the electrolyzed water. The controller supplies the electrolyzed water, stored in the second vessel, to the channel every given period of time.

(C) A heat exchange system includes the purifier of feature (A) or (B) and a heat exchanger connected via the purifier or the channel.

(D) The heat exchange system of feature (C) preferably further includes first and second temperature sensors. The first temperature sensor detects the temperature of the thermal fluid supplied to the heat exchanger. The second temperature sensor detects the temperature of the thermal fluid discharged from the heat exchanger following heat exchange by the heat exchanger. The controller preferably supplies the electrolyzed water to the channel on the basis of the readings of the first and second temperature sensors.

(E) In the heat exchange system of feature (C) or (D), the second vessel preferably includes an acidic water tank and an alkaline water tank. The acidic water tank stores acidic water, a type of the electrolyzed water. The alkaline water tank stores alkaline water, another type of the electrolyzed water. The controller preferably supplies the acidic water to the channel and adds the alkaline water to the acidic water supplied to the channel before the acidic water is discharged externally from the heat exchange system.

Ninth Embodiment

Figure 16:
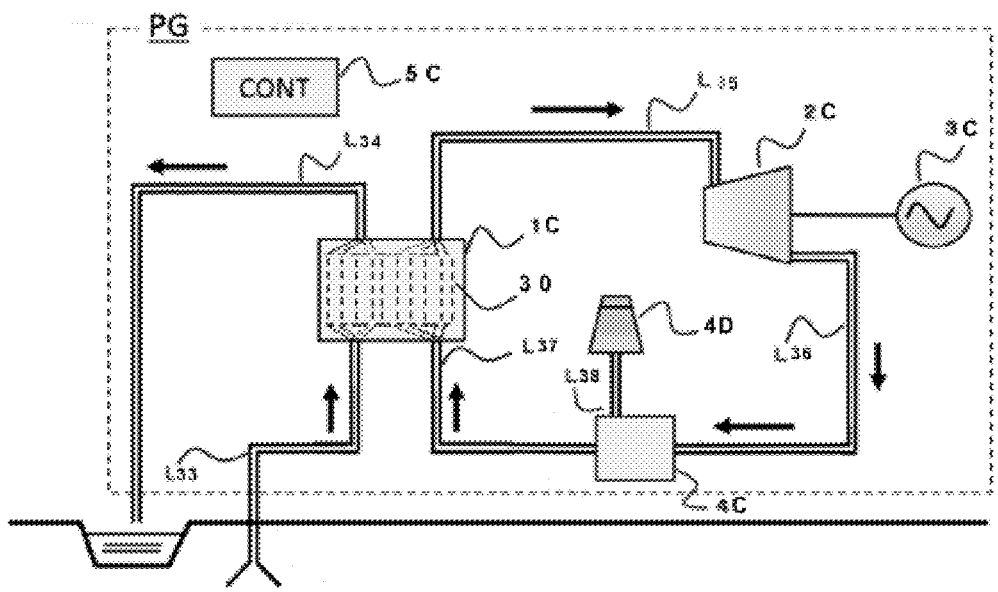
FIG. 16 is a block diagram of geothermal power generation system PG including heat exchanger 1 that has an electrode-containing pipe 7 that lies in the ninth embodiment.

FIG. 16 is an overall configuration diagram of a suitable geothermal power generation system PG according to a ninth embodiment of the present disclosure. It should be noted that although a description will be given below by taking, as an example, a geothermal power generation system, an electrode-containing pipe and a scale remover described in the present embodiment are widely applicable to various fields other than geothermal power generation where scale may develop (e.g., pipes through which industrial water flows).

The geothermal power generation system PG according to the present embodiment primarily includes a heat exchanger 1C, a steam turbine 2C, a generator 3C, a condenser 4C, a cooling tower 4D, a controller 5C, and pipes $L_{33}$ to $L_{38}$. Of these, the heat exchanger 1C has an electrode-containing pipe 30 in the present embodiment.

Further, the geothermal power generation system PG according to the present embodiment includes one or a plurality of pumps that are not shown. A thermal or working fluid (described later) circulates through one of the systems using these pumps.

It should be noted that known geothermal power generation systems such as that described in Japanese Patent Laid-Open No. 2012-13004 may be referred to for configurations other than those which will be described in detail in the present embodiment.

The heat exchanger 1C permits heat exchange between a thermal fluid (e.g., high temperature underground water) extracted, for example, from a steam well 500 meters to 3000 meters under the ground and a working fluid (e.g., water). More specifically, the thermal fluid is supplied into the heat exchanger 1C via the pipe $L_{33}$, and the working fluid is supplied into the heat exchanger 1C via the pipe $L_{37}$. It should be noted that among thermal fluids that can be used in the present embodiment are industrial wastewater (hot wastewater arising from industrial process such as hot water cleaning) and relatively high-temperature hot spring water in addition to high temperature underground water.

The thermal fluid which has exchanged heat with a working fluid in the heat exchanger 1C is returned, for example, to a river via the pipe $L_{34}$. On the other hand, the working fluid which has received heat from the thermal fluid in the heat exchanger 1C is sent to the steam turbine 2C via the pipe $L_{35}$.

The steam turbine 2C is connected to the heat exchanger 1C and the cooling tower 4D respectively via the pipes $L_{35}$ and $L_{36}$. The steam turbine 2C is also connected to the generator 3C which will be described later. The steam turbine 2C does work using a working fluid (e.g., water) in steam form supplied from the heat exchanger 1C.

The generator 3C generates power in accordance with work done by the steam turbine 2. Power generated by the generator 3C is supplied to substations of electric utilities, homes, and so on via transformers which are not shown.

The condenser 4C is connected to the cooling tower 4D via the pipe $L_{38}$ and to the heat exchanger 1C via the pipe $L_{37}$. Then, in the condenser 4C, the working fluid in steam form that has gone through the steam turbine 2C is condensed using, for example, water or air, transforming it into a working fluid in liquid form. Then, part of the working fluid that has been transformed into liquid form is sent to the cooling tower 4D via the pipe $L_{38}$ for cooling and returned to the condenser 4C via the pipe $L_{38}$ so as to cool the working fluid in steam form sent from the steam turbine 2C. Further, the remaining working fluid that has been transformed into liquid form is introduced again into the heat exchanger 1C. It should be noted that the only one pipe $L_{38}$ is shown in FIG. 16 for simplification, the plurality of pipes $L_{38}$ are actually provided for coming and going as described above.

The controller 5C is, for example, a PC connected to a network such as the Internet or a local area network (LAN), controlling the geothermal power generation system PG according to the present embodiment as a whole and controlling the heat exchanger 1C, the steam turbine 2C, the generator 3C, and so on in a centralized manner.

Further, the controller 5C applies a given potential to first and second electrodes 72 and 73 using a commercial power source e (not illustrated in FIG. 1 but illustrated in FIG. 2) as will be described later.

Here, when a thermal process is performed, for example, using the heat exchanger 1C in the geothermal power generation system PG, scale develops in pipes inside the heat exchanger 1C.

As scale develops in pipes and other structures, the geothermal power generation system PG may suffer a decline in heat exchange efficiency and further adverse impacts including reduced service lives of machinery and devices.

For this reason, in the present embodiment, the electrode-containing pipe 30 is employed in the heat exchanger 1C. The electrode-containing pipe 30 maintains the capability to remove scale and offers high maintainability. Further, the controller 5C applies a given potential to the electrode-containing pipe 30 using the commercial power source e. As described above, a scale remover includes the controller 5C and the electrode-containing pipe 30 in the present embodiment. On the other hand, although a description will be given below of an example in which the electrode-containing pipe 30 is employed in the heat exchanger 1C, the electrode-containing pipe 30 may be used in the condenser 4C or the cooling tower 4D instead.

A detailed description will be given below of the configuration of the electrode-containing pipe 30 arranged inside the heat exchanger 1C with reference to FIGS. 17A to 17C and 18.

Figure 17:
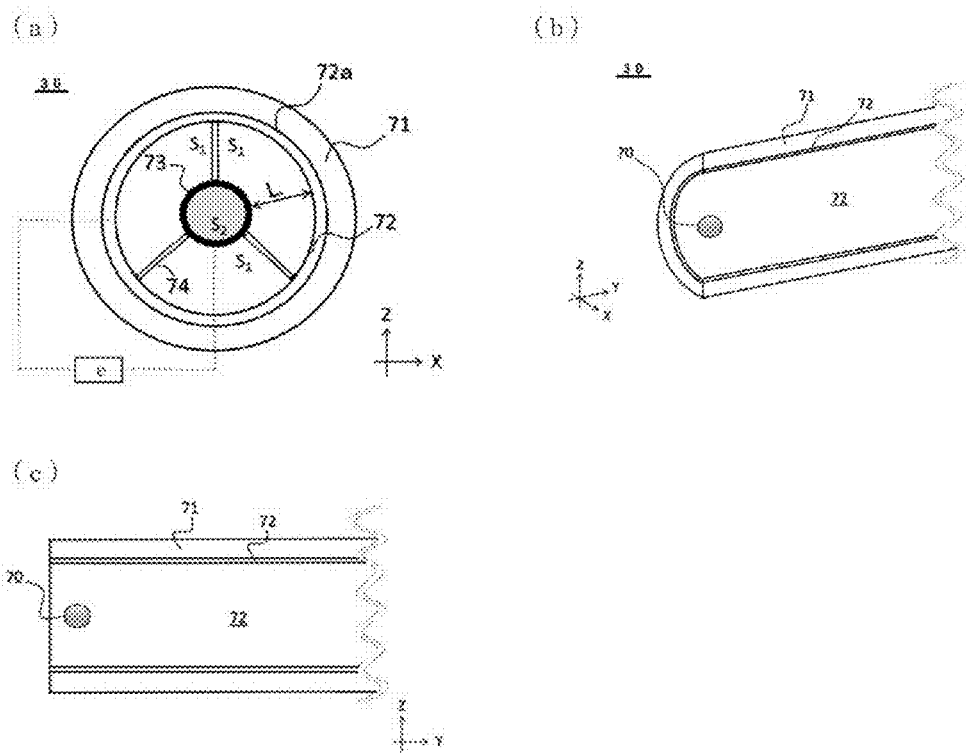
FIG. 17(a) is a cross section of the electrode-containing pipe 7 that peels off and lies in ninth embodiment, (b) is a perspective view in the section where connected hole 70, exterior material 71, and the 1st electrode 72 of the electrode-containing pipe 7 are shown, (c) is a section side chart where connected hole 70 and exterior material 71 of the electrode-containing pipe 7 are shown.

First, the electrode-containing pipe 30 according to the present embodiment includes the first and second electrodes 72 and 73 as illustrated in FIG. 17A. The first electrode 72 is tubular with a hollow space $S_1$ formed therein. A fluid flows through the space $S_1$. The second electrode 73 is inserted in the first electrode 72 in such a manner as to be spaced at a given distance L from the first electrode 72.

Thus, in the present embodiment, an insulating spacer 74 is arranged between the first electrode 72 and the second electrode 73. Further, the insulating spacer 74 supports the second electrode 73 such that a distance between the first electrode 72 and the second electrode 73 is substantially equal around the second electrode 73. In other words, the given distance L is constant around the second electrode 73.

The first electrode 72 is made of a known metallic material such as copper, graphite, or copper tungsten. The surface of the first electrode 72 may be plated, for example, with tin. It should be noted that a thermal fluid, an example of a fluid, flows through the first electrode 72 (i.e., through the hollow space $S_1$) as will be described later. Therefore, the first electrode 72 in the heat exchanger 1 is connected to the pipe $L_1$ adapted to supply the thermal fluid to the heat exchanger 1. The first electrode 72 is also connected to the pipe $L_{34}$ adapted to discharge, for example to a river, the thermal fluid following heat exchange with a working fluid.

An exterior member 71 is provided on an external surface 72a of the first electrode 72 in such a manner as to coat the first electrode 72. The exterior member 71 preferably has an insulating property and may be made, for example, of an insulating resin. Alternatively, a metallic exterior member may be coated with an insulating material.

The second electrode 73 is made of a known metallic material such as copper, graphite, or copper tungsten. The surface of the second electrode 73 may be plated, for example, with tin. Then, the second electrode 73 is spaced at the given distance L from the first electrode 72 inside the space $S_1$. The first and second electrodes 72 and 73 are connected to the commercial power source e, and an arbitrary potential can be applied to each of the electrodes by the controller 5C.

Further, in the present embodiment, the second electrode 73 is tubular (hollow) with a hollow space $S_2$ formed therein. A working fluid, an example of a fluid, flows through the hollow space $S_2$ as will be described later. It should be noted that the hollow space $S_1$ is larger in volume than the hollow space $S_2$ in the present embodiment.

Therefore, the second electrode 73 inside the heat exchanger 1C is connected to the pipe $L_{37}$ adapted to supply the working fluid to the heat exchanger 1C. The second electrode 73 is also connected to the pipe $L_{35}$ through which a working fluid in steam form resulting from heat exchange with the thermal fluid is sent to the steam turbine 2C.

It should be noted that the given distance L varies, as appropriate, depending on the inner diameter of the first electrode 72. However, the given distance L is preferably set so that the second electrode 73 remains out of contact with the first electrode 72 despite a fluid flowing through the space $S_1$.

In the present embodiment, insulating spacers 74 are arranged between the second and first electrodes 73 and 72 in such a manner as to maintain the second electrode 73 spaced at the distance L from the first electrode 72. In other words, the second electrode 73 is inserted in the hollow space $S_1$ of the first electrode 72 via the insulating spacers 74. Although there are no specific limitations on the material of the insulating spacers 74 so long the insulating spacers 74 are made of an insulating material, the insulating spacers 74 are suitably made of a known resin such as water- and heat-resistant fluorine-based resin or sponge. A description will be given later of a detailed structure of the insulating spacers 74 with reference to FIG. 3.

As illustrated in FIGS. 17B and 17C, the electrode-containing pipe 30 has a connection hole 70 near each of its both ends. In the present embodiment, the second electrode 73 communicates with the inside and outside of the exterior member 71 via the connection hole 70, thus connecting other pipes (e.g., $L_{35}$ and $L_{37}$) and the second electrode 73.

The connection hole 70 is provided with a given diameter in such a manner as to penetrate the exterior member and first electrode 71 and 72. Then, the connection hole 70 is sealed with an insulating sealing material after part of the second electrode 73 has been arranged inside the connection hole 70. It should be noted that a water-resistant resin, for example, is used as a sealing material. The connection hole 70 may be not necessarily cylindrical and may be, for example, rectangular. Further, the second electrode 73 is routed out of the exterior member 71 via the connection hole 70 for connection to the commercial power source e.

Figure 18:
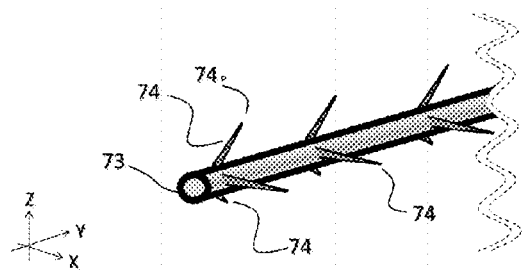
FIG. 18 is a perspective view for showing the second electrode 73 and non-conductivity spacer 74 of the electrode-containing pipe 7 that lies in the ninth embodiment are shown.

FIG. 18 illustrates detailed structures of the second electrode 73 and the insulating spacers 74 of the electrode-containing pipe 30 according to the present embodiment.

As is clear from FIG. 18, the insulating spacers 74 according to the present embodiment are provided intermittently in the Y direction in which the second electrode 73 extends, and the three insulating spacers 74 are provided around the second electrode 73 (rotation angle around the Y axis) at 120-degree intervals.

Each of the insulating spacers 74 is made of an elastically deformable resin and fastened to the outer peripheral surface of the second electrode 73. There are no specific limitations on how the insulating spacers 74 are fastened to the second electrode 73. For example, however, recess portions may be provided on the outer peripheral surface of the second electrode 73 so that the base portions (end portions on the opposite sides of tips $74_P$) of the insulating spacers 74 are press-fitted into the recess portions. Alternatively, the base portions of the insulating spacers may be bonded to the outer peripheral surface of the second electrode 73 with a water-resistant adhesive rather than providing recess portions on the outer peripheral surface of the second electrode 73.

In the present embodiment, the tips $74_P$ of the insulating spacers 74 are rigid to such an extent to allow elastic deformation. Then, the diameter of the circle passing through the tips $74_P$ of the insulating spacers 74 in the circumferential direction of the second electrode 73, for example, is set slightly larger than the inner diameter of the first electrode 72. This ensures that the insulating spacers 74 are elastically deformed when the second electrode 73 is inserted into the first electrode 72, thus allowing the second electrode 73 to be fastened inside the first electrode 72.

At this time, recess or projection portions may be formed at least on the surface of the first electrode 72 opposed to the second electrode 73. This ensures that the tips 74p of the insulating spacers 74 catch on the recess or projection portions formed on the surface of the first electrode 72, thus allowing the second electrode 73 to be fastened more stably inside the first electrode 72.

It should be noted that it may be not typically necessary to arrange the insulating spacers 74 at equal intervals around the second electrode 73. Instead, the insulating spacers 74 may be arranged at unequal intervals. Further, although the three insulating spacers 74 in total are provided around the second electrode 73 in the present embodiment, the one, two or four or more insulating spacers 74 may be provided so long as the second electrode 73 can be maintained at a given position inside the exterior member 71. It should be noted that if the insulating spacers 74 are provided in a number other than three, it is a matter of course that the insulating spacers 74 are provided around the Y axis at intervals other than 120 degrees.

Figure 19:
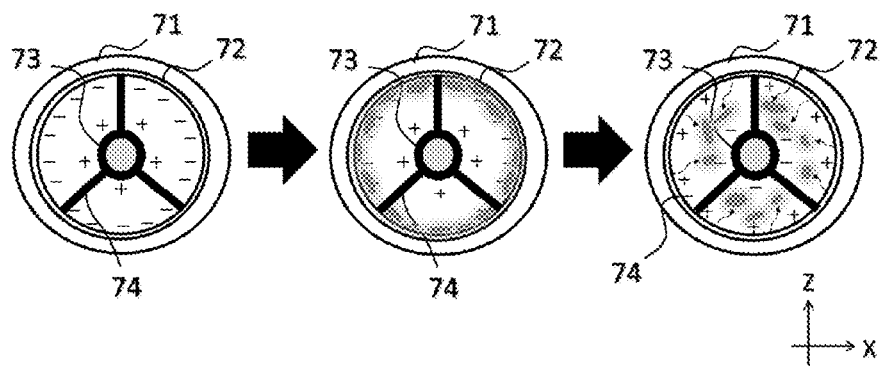
FIG. 19 is a figure for explaining a mode to which the scale is removed in the electrode-containing pipe 7 that lies in the ninth embodiment.

Next, a process of removing the scale in this embodiment is explained by using FIG. 19.

First of all, the cross section of the electrode-containing pipe 30 shown at the left of FIG. 19 shows the state of the electrode-containing pipe 30 at a certain standard moment. Here, "Standard moment" in this embodiment indicates the initial state in which the geothermal power generation system PG begins power generation or predetermined period when a prescribed period has passed from the initial state.

The controller 5C gives the potential of plus (+) to the second electrode 73 by commercial power source E at this standard moment while the potential of minus (−) is given to the first electrode 72. In other words, the first electrode 72 is assumed to be a cathode in the state at this standard moment, and the second electrode 73 functions as an anode.

And, the inside of the electrode-containing pipe 30 enters the state shown at the center of FIG. 19 when time has passed to some degree since the controller 5C has given each potential to the first electrode 72 and the second electrode 73. That is, an extraction thing precipitates on the first electrode 72 from the thermal fluid that flows in the midair space S1 in the electrode-containing pipe 30.

For instance, in case that the thermal fluid that flows in the built-in-electrode pipe 30 is hot spring water, it is thought that the chemical reaction shown in following type 1 is done at the first electrode 72 and a part of the soluble fraction (mineral) in the hot spring water precipitates as a scale.

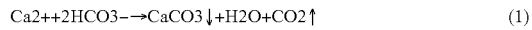

$$Ca^{2+} + 2HCO_3^- \rightarrow CaCO_3\downarrow + H_2O + CO_2\uparrow \quad (1)$$

And, after the scale precipitates on the first electrode 72, the controller 5C controls the first electrode 72 and the second electrode 73 to reverse the polarity. In other words, the controller 5C turns the first electrode 72 into an anode from the cathode by using commercial power source E and turns the second electrode 73 into a cathode from the anode.

It is possible to assume a timing of the reversal of polarity. For example, such reversal of polarity may be automatically done after a particular period has passed from the standard moment. This "particular period" may be calculated by an experiment or a simulation.

Or, in case a detection sensor such as a voltmeter, an ammeter, and an ohmmeter is arranged between the first electrode 72 and the second electrode 73, and then the detection value of the voltage, the current, or the resistance is monitored, the controller 5C may execute the reversal of polarity when the controller judges at least one of these detected values exceeded a prescribed threshold.

For instance, it is thought that the amount of the precipitation thing that piles up on the first electrode 72 increases as time advances from the standard moment, and then the value of current decreases gradually and settles to a constant current value. Therefore, it is better to arrange an ammeter (not shown in Figure) in the circuit including the first electrode 72 and the second electrode 73, and then the controller 5C executes the reversal of polarity when the value of the ammeter reaches a prescribed value.

When the reversal of polarity is executed, the scale extracted on the first electrode 72 dissociates from the first electrode 72 and starts to move to the second electrode 73 as the cathode, as shown in a right chart of FIG. 19. As a result, the scale extracted on the first electrode 72 is discharged to outside (river etc.) through the pipe L34. Thus, the scale extracted on the first electrode 72 is removed.

A flowing quantity of the thermal fluid that flows in the electrode-containing pipe 30 after executing the reversal of polarity may change to be a different value as compared to a flowing quantity of the thermal fluid before the reversal of polarity. For instance, the flowing quantity of the thermal fluid after the reversal of polarity becomes bigger than the flowing quantity before the reversal of polarity. As a result, it becomes possible to discharge the scale that dissociates from the first electrode 72 efficiently.

It is preferable to assume the scale removal processing mentioned above in this embodiment to be one cool, and to repeat this scale removal processing for every a prescribed period. Moreover, the reversal of polarity may repeat several times in one cool.

Tenth Embodiment

Next, tenth embodiment is explained below by using FIG. 20 and FIG. 21.

Hereafter, only difference points are explained in detail, and the explanation of the elements having same number and the same composition or the same function as the ninth embodiment are omitted.

Figure 20:
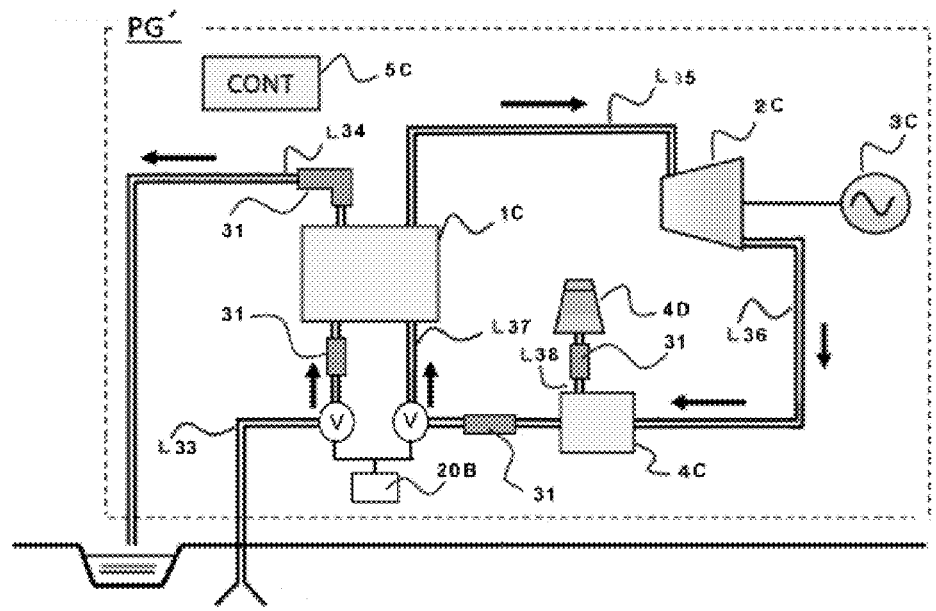
FIG. 20 is a block diagram of geothermal power generation system PG' including the scale removal device that has the electrode-containing pipe 7 that lies in the tenth embodiment

As shown in FIG. 20, the main difference between the ninth embodiment and the geothermal power generation system PG' in this embodiment is that using the electrode-containing pipe 31, setting up the electrode-containing pipe 31 in parts other than in the heat exchanger 1C, having the purifier 20B that supplies the cleaning solution in the faction of the geothermal power generation system PG' when the scale removal is processed, and having the switch valve V etc.

Figure 21:
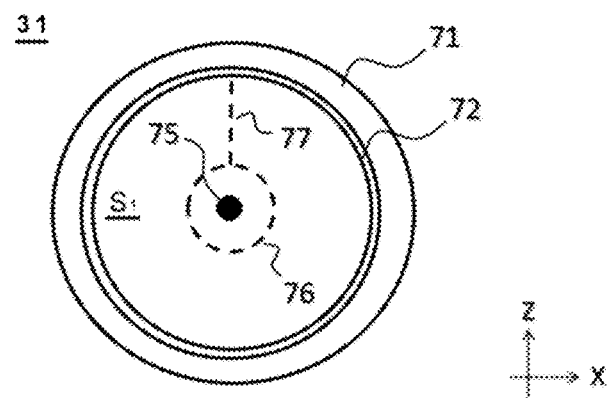
FIG. 21 is a section side chart where connected hole 70 and exterior material 71 of the electrode-containing pipe 7 that lies in the tenth embodiment are shown.

FIG. 21 shows the cross section of the electrode-containing pipe 31.

As shown in this figure, the electrode-containing pipe 31 comprises the second electrode 75 arranged in the midair space S1 in the first electrode 72. This second electrode 75 is a wire metal composed by a metallic wire line. Moreover, some kind of plating processing may be applied to a surface of the second electrode 75 so that the surface of the second electrode 75 has water resistance and corrosion resistance. Moreover, the second electrode 75 made of the wire line may have flexibility.

This second electrode 75 is arranged inside of the midair space S1 such that the second electrode 75 is enclosed by the protective member 76. The protective member 76 has meshed cylindrical body and is made of resin having non-conductivity in order to keep the second electrode 73 coming in contact with the first electrode 72 and short-circuited. The protective member 76 is hanged from the second electrode 72 or the exterior member 71 via the support piece 77 and thus the protective member 76 is supported via the support piece 77. The support piece 77 and the protective member 76 may be composed as a unit, or may be composed as a separate bodies.

In this embodiment, the electrode-containing pipe 31 is configured to arrange to be at least a part of the pipe L33, L34, L37, and L38. In other words, the electrode-containing pipe 31 is not limited in the form set up in the equipment such as a heat exchanger and a radiator, and may be used for a part or all of the pipe L. Moreover, though the electrode-containing pipe 31 is arranged at least a part of the pipe L33, L34, L37, and L38 in this embodiment, the electrode-containing pipe 31 may be used for at least a part of the pipe L35 and the pipe L36 (partially or all).

The purifier 20B is configured to supply a cleaning liquid (for instance, a water or a chemical agent with negative environmental impacts etc.) through a pump (not shown in the figure) when the removal of the scale is executed. The purifier 20B is also configured to suck the cleaning liquid through a negative-pressure source (not shown in the figure).

The controller 5C is configured to control the switch valve V (three-way valve etc.) so as to adjust opening of the switch valve V so that the cleaning liquid is supplied to the pipe L33 and the pipe L37 when the cleaning liquid is supplied from the purifier 20B.

In this embodiment, the electrode-containing pipe 31 set up at least a part of the pipe L34 is configured to be arranged in a tune part curved by 90 degrees.

The electrode-containing pipe 31 in this embodiment is also efficiently configured to remove the scale to the pipe of complex shape with the tune parts other than 90 degrees, because it is easy for the first electrode 72 and the 2nd electrode 73 to form an arbitrary shape. Moreover, because it is easily resoluble only in pulling out the second electrode 73 from the midair space S1 of the first electrode 72 at the time of maintaining, it becomes possible to greatly shorten the working hours required for this maintenance.

In addition, a liquid that flows inside of the electrode-containing pipe 31 is decomposed by an electric current and becomes an electrolyzed water in the ninth embodiment and this embodiment. Therefore, because the electrolyzed water will flow from the electrode-containing pipe 31 to the downstream, the effect of the scale removal can be demonstrated even in the downstream. It is not necessarily that all of a pipe for removing the scale is the electrode-containing pipe 31, and such pipe can be designed in terms of a balance of the scale removal effect and the cost properly.

The examples of transforming the ninth embodiment and the tenth embodiment are explained by using FIG. 22 as follows. Hereafter, only difference points are explained in detail, and the explanation of the elements having same number and the same composition or the same function as the ninth embodiment and the tenth embodiment are omitted.

Figure 22:
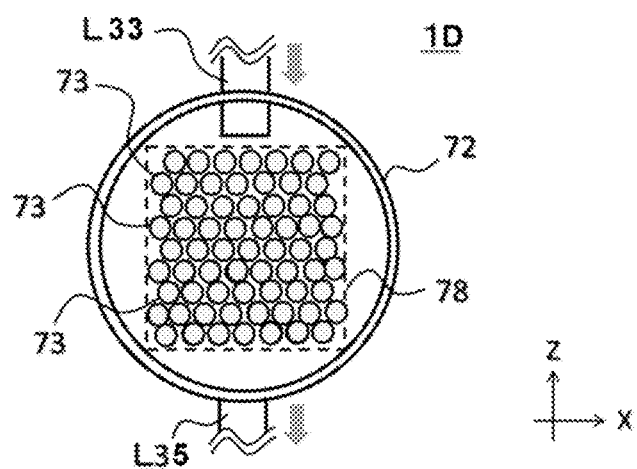
FIG. 22 is a partial cross section of shell and tube type heat exchanger 1.

The FIG. 22 shows the partial cross section of the heat exchanger 1D. That is, the heat exchanger 1D is a heat exchanger of a so-called shell and tube type, and comprises the first electrode 72, a plurality of second electrode 73 arranged in the first electrode 72, and a non-conductivity spacer 78 that lies between the first electrode 72 and the second electrode 73. The first electrode 72 has a midair shape, and the thermal fluid is discharged to outside through the pipe L35 after circulating inside the first electrode 72 through the pipe L33. Moreover, each second electrode 73 has a midair shape and the plurality of the second electrode 73 are configured to arrange in the first electrode 72. The second electrode 73 is configured to be connected with the pipe L37 and the pipe L35, and an operation fluid can circulate in each second electrode 73.

The non-conductivity spacer 78 is made up of a meshed non-conductivity resin for instance, and the plurality of the second electrodes 73 are arranged inside the non-conductivity spacer 78. That is, because the non-conductivity spacer 78 lies between the first electrode 72 and the second electrode 73, the first electrode 72 and the second electrode 73 are prevented short-circuited.

As mentioned above, the first electrode 72 and the 2nd electrode 73 are connected with the commercial power source E, and prescribed potential is given to the first electrode 72 and the 2nd electrode 73 under the control of the controller 5C.

According to this transformation example, the operation fluid that circulates in the second electrode 73 can efficiently exchange heat between the thermal fluid introduced in the first electrode 72 through the pipe L33. In addition, because the scale extracted in the first electrode 72 is efficiently removed under the control of the controller 5C, a heat exchanger and a geothermal power generation system with excellent heat exchange effectiveness and requiring little maintenance can be achieved.

Note that the ninth and tenth embodiments described above can be said to provide the following features:

(α) An electrode-containing pipe includes first and second electrodes.

The first electrode is tubular with a hollow space formed therein. A fluid flows through the space.

The second electrode is inserted in the hollow space of the first electrode in such a manner as to be spaced at a given distance from the first electrode.

(β) In the electrode-containing pipe of feature (α), the second electrode is preferably hollow so that a fluid can flow therethrough.

(γ) In the electrode-containing pipe of feature (α), the second electrode is made of a bendable and wire-shaped metal.

(δ) The electrode-containing pipe of any one of features (α) to (γ) preferably further includes insulating spacers adapted to maintain the second electrode spaced at the given distance from the first electrode.

(ε) A scale remover includes the electrode-containing pipe of any one of features (α) to (δ) and a controller.

The controller applies a given potential between the first and second electrodes in the electrode-containing pipe.

(ζ) A scale removal method includes causing a thermal fluid to flow between first and second electrodes of an electrode-containing pipe and a working fluid to flow through the second electrode. The first electrode is tubular with a hollow space formed therein. The second electrode is inserted in the hollow space of the first electrode in such a manner as to be spaced at a given distance from the first electrode.

The scale removal method further includes causing minerals, included in the thermal fluid, to precipitate on the first electrode by applying a given potential between the first and second electrodes.

The scale removal method further includes reversing the polarity of the first and second electrodes.

The scale removal method still further includes discharging the minerals detached from the first electrode after having reversed the polarity.

The above embodiments can be modified in various ways without departing from the scope of the present disclosure. A description will be given below of a modification example to which the embodiments are applicable. It should be noted that the description will be given by taking the configuration of the first embodiment as an example for reasons of convenience. However, the modification example is applicable to other embodiments as described above.

Modification 1

Figure 23:
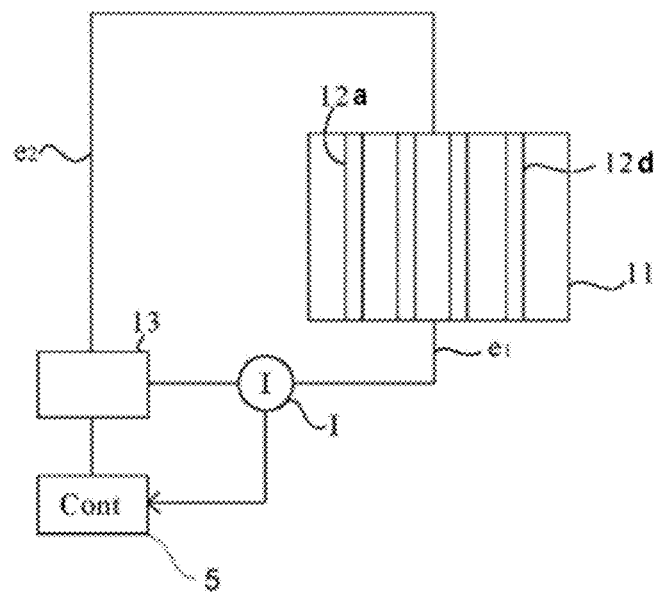
FIG. 23 is a figure for explaining the system of transformation example 1.

The FIG. 23 is a figure for explaining the modification 1. In the FIG. 23, a heat exchanger or a geothermal power generation system comprises an ammeter I that measures a current that flows in electrode 12 in the heat exchanger 1. The ammeter I is configured to arrange between the heat exchanger 1 and the control part 13.

The whole controller 5 monitors the current value measured by the ammeter I, and controls the reversal of polarity operation of the electrode board 12 via the control part 13 of the heat exchanger 1 based on the detected current value.

For instance, when the measurement value (current value) measured by the ammeter I decreases more than a prescribed threshold, the whole controller 5 does the control that reverses the polarity of the electrode board 12. At this time, the whole controller 5 may also execute the aforementioned washing processing and stop the circulation of the operation fluid.

Though the whole controller 5 executes the reversal of the polarity with use of the ammeter I, the whole controller 5 may execute the reversal of the polarity based on a voltage value between the cathode board and the positive plate measured by a voltage meter.

Modification 2

Figure 24:
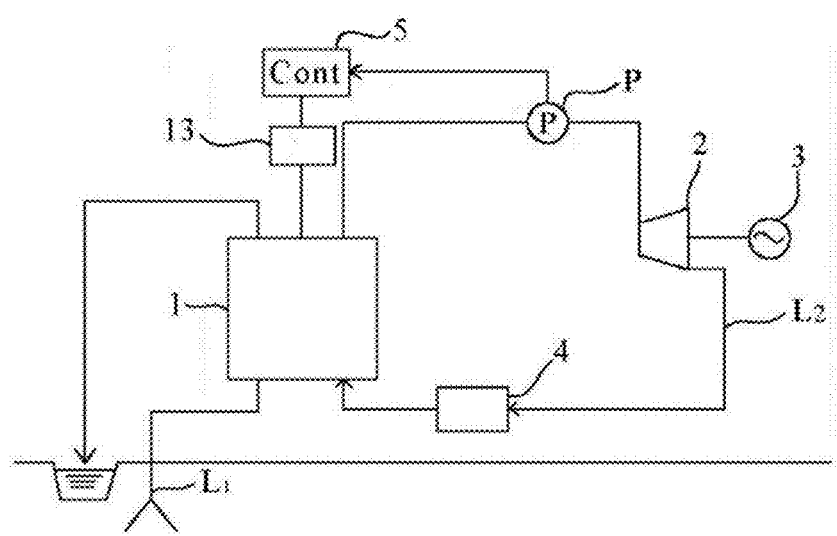
FIG. 24 is a figure for explaining the system of transformation example 2.

The modification 2 is shown in the FIG. 24. In the FIG. 24, a heat exchanger or a geothermal power generation system comprises a pressure gauge P that measures a pressure of the steam of the operation fluid sent from the heat exchanger 1 to the steam turbine 2. The pressure gauge P is configured to arrange in the pipe provided between the heat exchanger 1 and the steam turbine 2.

The whole controller 5 monitors the pressure value measured by the pressure gauge P, and controls the reversal of the polarity operation of the electrode board 12 via the control part 13 of the heat exchanger 1 based on the detected pressure value.

For instance, the whole controller 5 executes the reversal of the polarity operation of the electrode board 12 when the measurement value (pressure value) measured by the pressure gauge P decreases more than a prescribed threshold (for instance, a value based on the pressure value of flowing in the heat exchanger 1 from the condensation machine 4). At this time, the whole control part 5 may also execute the washing processing and stop the circulation of the operation fluid.

Modification 3

Figure 25:
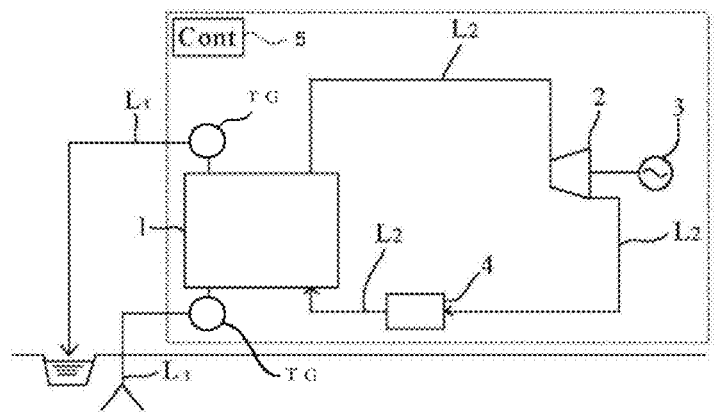
FIG. 25 is a figure for explaining the system of transformation example 3.

The FIG. 25 explains the modification 3. In the modification 3, the thermometer TG detects a first temperature of the first fluid (hot water etc.) that flows in the heat exchanger 1 and a second temperature of the first fluid that flows out from the heat exchanger 1.

The whole controller 5 is configured to monitor the temperature values measured by the thermometer TG, to compare the first temperature and the second temperature, and to execute the inversion operation of the electrode board 12 via the control part 13 of the heat exchanger 1 when a difference between the first temperature and the second temperature becomes below a prescribed value.

More concretely, the thermometer TG is arranged to the first pipe L1 such that the heat exchanger 1 is wedged between a pair of the thermometer TG placed back and forth of the heat exchanger 1, and a temperature detected by a first thermometer TG on the upstream side to the heat exchanger and a temperature detected by a second thermometer TG on the downstream side to the heat exchanger 1 are compared.

For instance, it is guessed that the heat exchange efficiency of the heat exchanger 1 has decreased when the temperature detected by the second thermometer TG has not descended so much compared with the temperature detected by the first thermometer TG.

Therefore, the whole controller 5 controls the reversal of the polarity operation of the electrode board 12 via the control part 13 of the heat exchanger 1 according to the difference of the temperature measured respectively with the first thermometer TG and the second thermometer TG. For instance, the washing processing including the reversal of the polarity operation may be executed if the difference of the detected temperature is below a prescribed value. At this time, the whole control part 5 may also execute the washing processing while stops the circulation of the operation fluid.

Or, the controller 5 may execute at least one of the first purification mode and the second purification mode explained before when the difference between the measurement value of the first temperature sensor S1 and the measurement value of the second temperature sensor S2 becomes below a prescribed value.

Moreover, though the above system uses the detected temperature of the first fluid in the modification 3, it is possible to detect the temperature of the second fluid that flows in and flows out from the heat exchanger 1.

Modification 4

Figure 26:
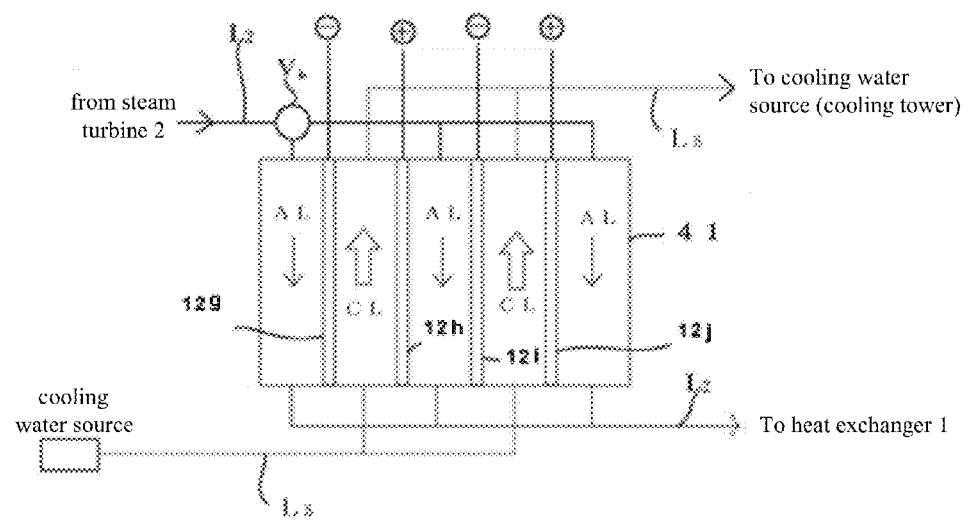
FIG. 26 is a figure for explaining the system of transformation example 4.

The modification 4 is explained by using FIG. 26. The composition of the condensation machine 4 is different as compared to that of the binary power generating system BES1 in the first embodiment. That is, the condensation machine 41 of modification 4 comprises the electrode board 12g-12j corresponding to the electrode board 12a-12d mentioned above which is arranged respectively in the vessel as the electrolytic bath. And a first flow path in which an operation fluid (roughly a state of vapor-liquid layer) circulates and a second flow path in which a cold fluid circulates is divided by these electrode boards 12 respectively.

In the point where this modification 4 is different from the above-mentioned embodiments or other modifications is that the liquid (the first liquid) applied to the purification processing is a cold fluid (for instance, cold water) that flows in the condensation machine 4. That is, it is not comparatively limited that the first fluid has high temperature (warm water and hot water, etc.), but the first fluid comprises comparatively low temperature liquid.

For instance, a cold liquid that flows in the condensation machine 4 through the 5th pipe L5 circulates between a cooling tower and the condensation machine 4 at the time when the binary power generation is carried out. For instance, the cold liquid can be applied to a cold water (cooling water) and a well-known refrigerant (HFE etc.), for example. Therefore, the possibility that some elements are extracted can be assumed according to a kind of the cold liquid used. Therefore, according to the modification 4, it becomes possible to execute the purification processing to a cold liquid that flows in the condensation machine 4, and thus becomes possible to push up the efficiency of the entire system further.

Though at least a part of the flow path in the heat exchanger 1 is formed with the electrode board in the first embodiment, the first pipe L1 connected with the heat exchanger 1 may be arranged to build an extension as it is in the heat exchanger 1, or another pipe whose thermal conductivity is higher than the 1st pipe L1 may be arranged in the heat exchanger 1.

Figure 27:
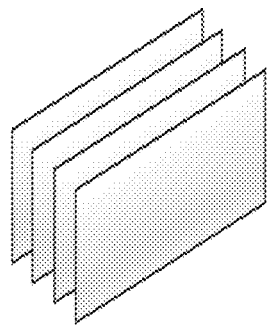
FIG. 27(a) is a perspective view for showing a board type electrode plate, (b) is a perspective view for showing a wave surface type electrode plate having a snaking curved surface, (c) is a perspective view for showing a concave-convex type electrode plate having a concavo-convex surface.
Figure 27:
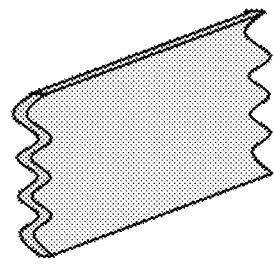
Figure 27:
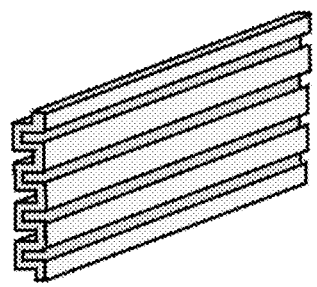

It is not necessary for the electrode board 12 to be a tabular type as shown in FIG. 27(a). A wave surface type electrode plate having a snaking curved surface may be applied to the electrode board 12 as shown in FIG. 27(b), or a concave-convex type electrode plate having a concavo-convex surface may be applied to the electrode board 12 as shown in FIG. 27(c). It is preferable for the electrode board 12 to be same kind and same shape in the face of the electrode board 12 so that a distance between the electrodes becomes uniform as much as possible when a plurality of the electrode board 12 shown in FIG. 27(b) or 27(c) are arranged and adopted. Moreover, it is preferable that the electrode board 12 is arranged in the electrolytic bath such that the concave portion and the convex part of the electrode board 12 postpones along a direction of the flow of the aforementioned first fluid and the aforementioned second fluid.

It is possible to combine the elements as mentioned in the each embodiments and modifications in order to build a geothermal power generation system. Moreover, this invention as explained may apply not only the binary power generation system but also other types of geothermal power generation system. Furthermore, this invention as explained may also apply to other power generation methods to exchange heat by using a fluid.

INDUSTRIAL APPLICABILITY

The heat exchanger and the power generating system of this invention as explained above are suitable for constructing a low-cost, highly effective system.

What is claimed is:

1. A heat exchanger for a power generation system, comprising:
   an electrolytic bath having first and second channels, a first fluid being able to flow through the first channel, and a second fluid that exchanges heat with the first fluid being able to flow through the second channel, and at least part of the first and second channels of the electrolytic bath being partitioned by anode and cathode plates to which a given potential is applied from a power source; and
   a control section adapted to repeat, at given time intervals, a cleaning process that applies the given potential to the anode and cathode plates by starting energization of these plates, next applies a potential reversed in polarity to the given potential, and then cancels the energization,
   wherein the control section applies the given potential and the potential reversed in polarity to the anode and cathode plates such that a period from cancellation of the energization to restart of the energization and application of the given potential is longer than a period during which the given potential and the potential reversed in polarity are applied to the anode and cathode plates, and
   wherein the potential reversed in polarity is applied after the given potential in succession, and wherein a set of the given potential and the potential reversed in polarity is repeated at given time intervals in the cleaning process.

2. The heat exchanger according to claim 1, wherein a plurality of anode and cathode plates are arranged alternately and opposed to each other within the electrolytic bath.

3. A scale removal apparatus, comprising:
   a pair of electrode plates that forms at least a part of a first channel through which a first fluid including minerals flows; and
   a control section adapted to repeat, at given time intervals, a cleaning process that first applies a given potential to the pair of electrode plates by starting energization of these electrode plates, next applies a potential reversed in polarity to the given potential, and then cancels the energization,
   wherein the control section applies the given potential and the potential reversed in polarity to the pair of electrode plates such that a period from cancellation of the energization to restart of the energization and application of the given potential is longer than a period during which the given potential and the potential reversed in polarity are applied to the pair of electrode plates, and
   wherein the potential reversed in polarity is applied after the given potential in succession, and wherein a set of the given potential and the potential reversed in polarity is repeated at given time intervals in the cleaning process.

4. The scale removal apparatus according to claim 3, further comprising:
   a vessel which accommodates the pair of the electrodes and in which a second channel neighboring to the first channel via the electrodes is provided,
   wherein a second fluid adapted to exchange heat with the first fluid flows in the second channel.

5. The scale removal apparatus, according to claim 4, further comprising:
   a sealing material provided at a boundary between a wall surface of the vessel and the electrodes,
   wherein a liquid leakage between the first channel and the second channel is prevented by the sealing material.

6. A heat exchange system, comprising:
   a purifier; and
   a heat exchanger connected to the purifier via a channel, wherein
   the purifier includes
      a first vessel that is connected to the channel through which a thermal fluid flows, an anode and a cathode being arranged to be opposed within the first vessel, with a space formed between the anode and the cathode,
      a second vessel that is connected to the first vessel and includes an acidic water tank that stores acidic water, a type of electrolyzed water produced by the first vessel, and an alkaline water tank that stores alkaline water, another type of the electrolyzed water, and
      a controller adapted to apply a voltage between the anode and the cathode with a given liquid provided in the space and supply, after storing electrolyzed water produced by applying the voltage to the given liquid in the second vessel, the acidic water stored in the second vessel to the channel and add the alkaline water to the acidic water supplied to the channel after the acidic water flows through the heat exchanger and before the acidic water is discharged externally from the heat exchange system, and
   the controller adds the acidic water to the thermal fluid flowing into the heat exchanger at given intervals while heat exchange by the thermal fluid continues in the heat exchanger, and wherein the heat exchanger is purified by the thermal fluid with the acidic water added, and the amount of the thermal fluid is greater than the amount of the added acidic water when the acidic water flows into the heat exchanger.

7. The heat exchange system according to the claim 6, further comprising:
   a first temperature sensor which detects temperature of the thermal fluid to be supplied to the heat exchanger; and
   a second temperature sensor which detects temperature of the thermal fluid performed heat exchange in the heat exchanger and then discharged from the heat exchanger,
   wherein the controller is configured to supply the acidic water to the channel based on the measurement values of the first temperature sensor and the second temperature sensor.

8. The heat exchange system according to the claim 6, wherein the controller is configured to supply the acidic water while the controller changes an amount of the supplied acidic water at given time intervals.

9. The heat exchange system according to the claim 6, further comprising:
   a temperature sensor provided to the acidic water tank and which detects temperature of the stored acidic water; and
   a temperature regulator provided to the acidic water tank and which adjusts temperature of the stored acidic water,
   wherein the controller is configured to adjust the temperature of the stored acidic water by the temperature regulator based on the detection result of the temperature sensor.

10. The heat exchange system according to the claim 6, further comprising:

a pH detector which detects a pH of the alkaline and the acidic combined water before the acidic water is discharged externally from the heat exchange system, wherein the controller controls the amount of alkaline water added to the acidic water based on the detection result of the pH detector.

* * * * *